United States Patent [19]

Adams et al.

[11] Patent Number: 5,459,867
[45] Date of Patent: Oct. 17, 1995

[54] KERNELS, DESCRIPTION TABLES, AND DEVICE DRIVERS

[75] Inventors: Phillip M. Adams, Parowan; Larry W. Holmstron, Salt Lake City; Steve A. Jacob, South Weber; Steven H. Powell, Ogden, all of Utah; Robert F. Condie; Martin L. Culley, both of Tuscon, Ariz.

[73] Assignee: Iomega Corporation, Roy, Utah

[21] Appl. No.: 129,809

[22] Filed: Sep. 30, 1993

Related U.S. Application Data

[63] Continuation of Ser. No. 425,745, Oct. 20, 1989, abandoned.
[51] Int. Cl.$^6$ .................................................. G06F 13/00
[52] U.S. Cl. ........................ 395/700; 395/828; 395/883; 395/892; 364/DIG. 1; 364/280.4; 364/284
[58] Field of Search .......................... 364/DIG. 1, DIG. 2

[56] References Cited

U.S. PATENT DOCUMENTS

| | | | |
|---|---|---|---|
| 3,702,007 | 10/1972 | Davis, II | 364/DIG. 1 |
| 4,559,614 | 12/1985 | Peek et al. | 364/900 |
| 4,589,063 | 5/1986 | Shah et al. | 364/200 |
| 4,649,479 | 3/1987 | Advani et al. | 364/300 |
| 4,703,416 | 10/1987 | Cpupi et al. | 364/200 |
| 4,783,730 | 11/1988 | Fischer | 395/275 |
| 4,858,114 | 8/1989 | Heath et al. | 395/775 |
| 4,901,231 | 2/1990 | Bishop et al. | 364/200 |
| 4,972,312 | 11/1990 | Den Boef | 364/200 |
| 4,974,151 | 11/1990 | Advani et al. | 364/200 |
| 4,975,829 | 12/1990 | Clarey et al. | 364/200 |
| 4,993,030 | 2/1991 | Krakauer et al. | 371/40.1 |
| 5,109,515 | 4/1992 | Laggis et al. | 395/725 |
| 5,136,709 | 8/1992 | Shirakabe et al. | 395/700 |

OTHER PUBLICATIONS

Geihs et al, An Architecture for the Cooperation of Heterogeneous Operating /Systems, Proceedings of the Computer Networking Symposium, pp. 300–312, IEEE Computer Society Press, Washington D.C. Conference Date: 11–Apr. 1988.

Janet I. Egan, Thomas J. Teixeira, Writing a VNIX Device Driver, 1988.

*Primary Examiner*—Kevin A. Kriess
*Assistant Examiner*—Lucien Toplu
*Attorney, Agent, or Firm*—Jon C. Christiansen; Lee A. Hollaan; Daniel P. McCarthy

[57] ABSTRACT

Description tables can be linked to a kernel to form a device driver. The description tables can be device description tables and adapter description tables. The kernel is operating system dependent. The description tables are operating system independent and can be linked to other kernels for other operating systems. A library of kernels for different operating systems can share a common set of kernel requests.

9 Claims, 12 Drawing Sheets

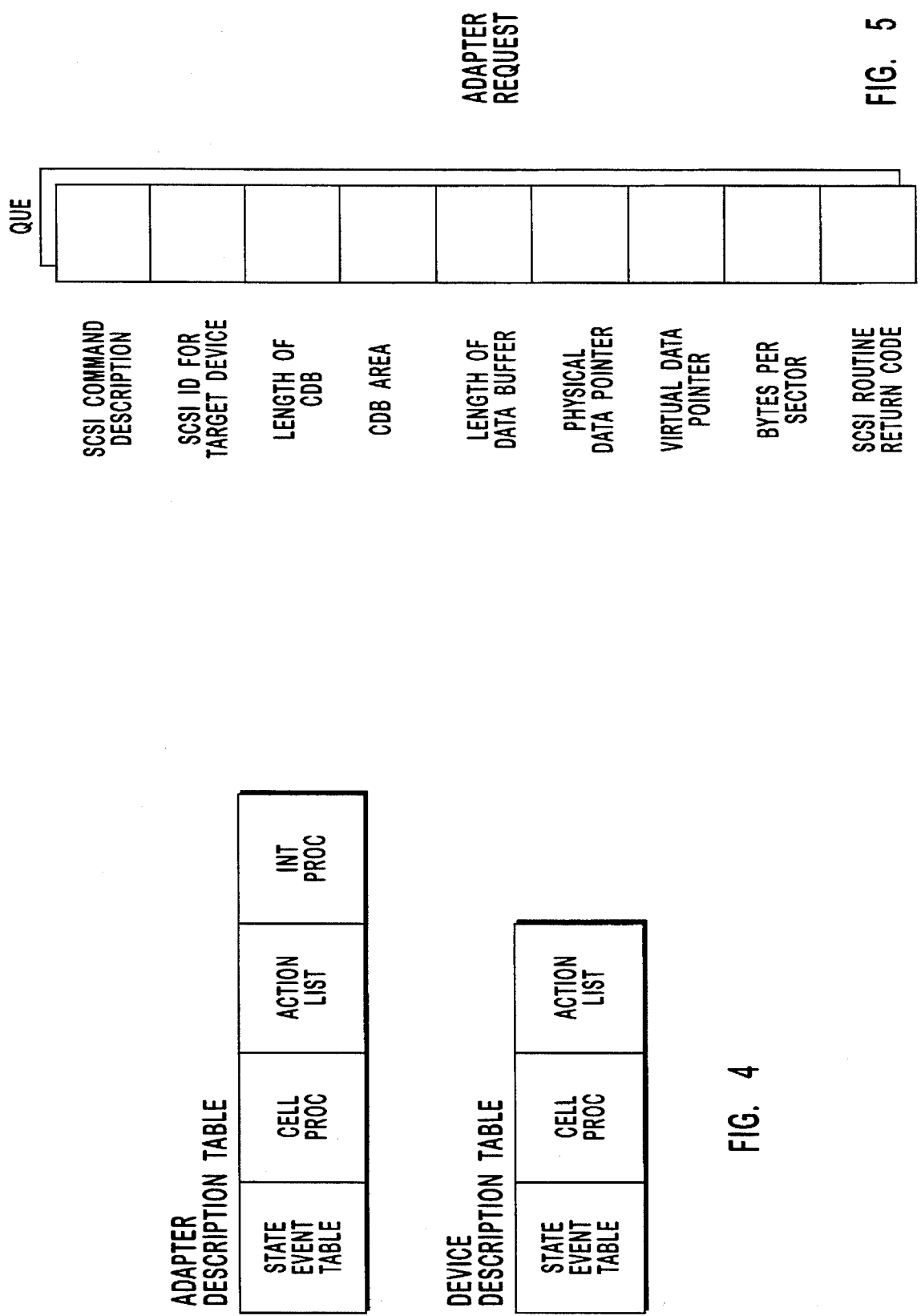

KERNELS, DESCRIPTION TABLES, AND DEVICE DRIVERS

This application is a continuation application of parent application Ser. No. 07/425,734 filed on Oct. 20, 1989, now abandoned and priority thereto is hereby claimed.

REFERENCE TO MICROFICHE APPENDIX

The application includes a microfiche appendix containing 12 microfiche having 840 frames.

I. TECHNICAL FIELD

This invention is in the area of device drivers and technology, methods and computer programs relating to device drivers.

II. BACKGROUND ART

A computer system typically includes, in addition to the computer itself, one or more peripheral devices, such as printers, magnetic tape drives, hard disk drives, floppy disk drives, removable cartridge drives, modems, etc. An adapter is used as the hardware connection between a peripheral device and the computer. Computers require special computer programs to support or "drive" the devices. These computer programs are commonly referred to in the computer industry as "device drivers."

Conventionally, each specific kind of device requires a unique device driver. For example, two different types of hard disk drives may require two different device drivers. With the advent of new computer interface standards such as the Small Computer Systems Interface (SCSI), it is possible for a plurality of devices to share a common adapter. However, a plurality of device drivers are often needed for a plurality of different devices even when they are attached to the same adapter.

Prior art device drivers are dependent upon the operating system for which they are written. The device driver must satisfy the device driver requirements of the operating system. A device driver written for one operating system cannot be used with a different operating system.

The ease and success with which a plurality of devices can be attached to a computer have been hampered by the independent development of incompatible device drivers, by the difficulty of testing device drivers for errors when changes or enhancements are made, and by problems arising from the unintended interaction of device drivers with each other or the operating system or other computer programs.

Prior art device drivers attempting to support devices and/or adapters are not flexible in allowing support for specific devices and adapters. The code is closely coupled. Modifications to add or delete devices or adapters cause significant increases in testing and maintenance costs.

The device driver of our invention overcomes these and other limitations and disadvantages of prior art device drivers. It is an objective or our invention to provide a device driver that is flexible and that can be configured to reflect the configuration of devices and adapters selected by the user. Another objective of our invention is to make easier the use of devices and adapters with different operating systems. These objectives and other objectives, advantages and aspects or our invention are described in the following disclosure and claims and in the accompanying drawings.

III. BRIEF SUMMARY AND DISCLOSURE OF INVENTION

Our invention includes kernels, description tables and device drivers and related methods. The invention can be used with a digital computer.

One or more description tables can be linked to a kernel to form a device driver. The kernel and linked description tables can be resident in a computer memory of a digital computer having devices and adapters attached to it. The kernel is linked to the operating system (i.e., the kernel receives operating system requests issued by the operating system). The kernel is operating system dependent and is a means for linking the description table(s) to the operating system. The description table(s) is (are) linked to the operating system, i.e., the kernel and description table(s) form a device driver that receives and processes operating system requests from the operating system. The description tables are operating system independent and can be linked to other operating systems through other kernels. The device driver formed by the kernel and description table(s) receives an operating system request from the operating system, processes the operating system request, creates a device command for the device supported by the device driver, and issues the device command to the device.

Preferably, a device description table and an adapter description table are linked to the kernel. The device description table supports a device attached to the digital computer. The adapter description table supports an adapter attached to the digital computer. The device is attached to the adapter. The kernel can have an environmental map to translate an operating system into a kernel request. The device description table can process the kernel request and create an adapter request. The adapter request can include a device command and an adapter description table command. The adapter description table can process the adapter request and can issue the device command to the device. The adapter description table can also create adapter commands and issue them to the adapter.

The kernels in the library share a common set of kernel requests, i.e., there is a core group of kernel requests used by each kernel. This allows a description table that can process this common set of kernel requests to be used with different kernels supporting different operating systems. It should be noted that some kernels in the library may use additional kernel requests that are not in the common set of kernel requests and are not used by all of the other kernels in the library. Nonetheless, the kernels still share a common set of kernel requests (i.e. the core group).

The kernels in the library can share a common set (i.e. core group) of service routines and/or a common set (i.e. core group) of initialization routines. As with kernel requests, some kernels in the library may use additional service routines and/or additional initialization routines. Nonetheless, the kernels still share a common set of service routines and/or a common set of initialization routines. It should also be noted that the sharing of a common set of service routines does not mean that the code of the service routines for one kernel is identical to the code of the service routines for another kernel. Instead, it should be understood that this means that the service routines perform substantially the same functions. This concept also applies to the initialization routines.

The kernel includes a means for linking the description tables to the kernel. This means can be a table interface such as a global data structure or any other interface or linkage.

The kernel can also include a sequencer for activating and sequencing description tables. The sequencer can be any means which coordinates description table operation.

The kernel can also include a service map for providing service routines to the kernel and/or description tables, and an initialization map for providing initialization routines to the kernel.

The description tables can include action routines. The action routines are executable by the digital computer to cause the desired result, action or function ("action routine function"). The set or list of action routines is an action list. A description table can include a means for selecting an action routine in response to a kernel request or adapter request. This selection means can be any means which performs the selection.

Preferably, the selection means includes a table having references to the action routines in the action list, and an accessing means which can access the table and select an action routine. Although other means can be used to practice our invention, a preferred table of references is a state event table and a preferred accessing means is a cell processor. The state event table can be separate from the cell processor or combined with it.

The kernel and description tables can be loaded into the computer memory of a digital computer and are executable by the digital computer (i.e., the computer programs, routines and data of the kernel and description tables can be executed, read and/or otherwise processed by the digital computer). The kernel and description tables can also be resident in a computer memory storage medium other than a computer memory.

Our invention also includes a library of kernels and description tables from which a kernel and needed description tables can be selected for a given computer system configuration. Each kernel in the library supports a different operating system. The description tables can be linked to any operating system through the kernel for that operating system. The kernels can share a common set of kernel requests. The kernels can also share a common set of initialization routines and/or service routines. The device description table can process the kernel requests created by the kernels.

Our invention further includes special device description tables in the form of logical device description tables, default device description tables and pseudo device description tables. A logical device description table is supported by one or more default device description tables that can be invoked by the logical device description table. A pseudo device description table processes data.

IV. BRIEF DESCRIPTION OF DRAWINGS

FIG. 4 depicts an adapter description table and a device description table.

FIG. 5 depicts an adapter request.

V. DETAILED DESCRIPTION OF INVENTION AND BEST MODE FOR CARRYING OUT INVENTION

A. Overview of Invention

Figure 1:
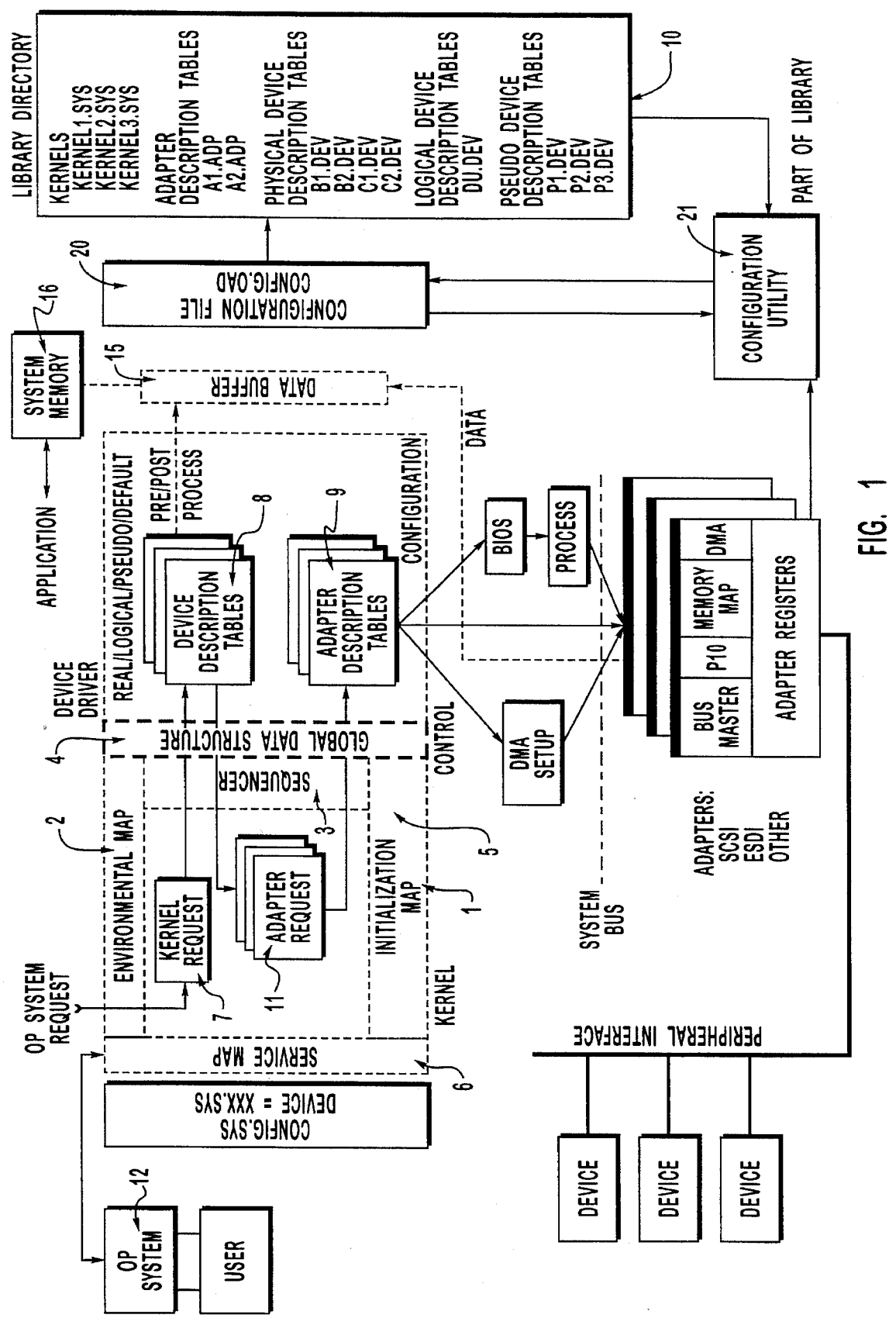
FIG. 1 depicts an overview of an embodiment of the inventive device driver.

FIG. 1 shows an overview of an embodiment of the invention. A kernel 1 includes environmental map 2, sequencer 3, global data structure 4, initialization map 5, service map 6 and queues 7 and 11. Device description tables 8 and adapter description tables 9 are linked to kernel 1 through global data structure 4 which serves as a table interface. The kernel and the linked description tables form a device driver.

The library 10 is a directory which contains kernels, adapter description tables and device description tables which are stored as files. Device description tables include physical device description tables (B1.DEV, B2.DEV, C1.DEV, C2.DEV, ... ), logical device description tables (DU.DEV, ... ), and pseudo device description tables (P1.DEV, P2.DEV, P3.DEV, Each of the kernels (KERNEL1.SYS, KERNEL2.SYS, KERNEL3.SYS, ... ) in library 10 supports a different operating system. For example, KERNEL1.SYS is compatible with the MS-DOS operating system, KERNEL2.SYS is compatible with the OS/2 operating system, and KERNEL3.SYS is compatible with the Unix operating system. Other kernels can be added to the library which support (i.e. are compatible with) other computer operating systems.

The environmental map 2 is a computer program that translates operating system requests into kernel requests. An operating system request is an input-output request which is directed to a device (e.g. hard disk drive, printer, Bernoulli drive, floppy disk drive, tape drive, optical disk, modem, etc.). The kernel requests are common to all kernels in library 10, i.e., the kernels in library 10 each share and use a common set or list of kernel requests. Thus, kernel requests are not unique to a particular kernel but are common to each of the kernels in library 10. This allows a single device or adapter description table created for a particular device or adapter to be used with (i.e. linked to) any of the kernels in library 10 and, therefore, with any of the operating systems for which those kernels are created.

Kernel requests, from environmental map 2, are queued in queue 7 to allow for multi-task operation in those operating system environments which provide multi-task operation. If the operating system in use does not provide multi-task operation, then a single element queue is used.

Service map 6 of Kernel 1 provides service routines to the kernel and the description tables.

Global data structure 4 serves as the kernel's interface with description tables. Because each kernel has this table interface, each description table in library 10 can be used with any of the kernels in library 10. Thus, the description table for a given device or adapter only needs to be written once, i.e., it does not need to be written separately for each kernel or operating system.

The device driver (i.e. kernel 1 and description tables 8 and 9) is assembled as it is loaded from library 10 which contains the various kernels, adapter description tables and device description tables available for selection and use by the user. A configuration file 20 (CONFIG.OAD) controls the assembly of the device driver. This installation specific configuration file is created by the user using the configuration utility 21. The configuration utility is a computer program which is used by the user to define the system configuration selected by the user. The configuration utility also checks for compatible configurations and provides information to the kernel which is specific to a description table but is independent of the user's configuration and is not known by the user.

Device description tables translate kernel requests into device specific information. Because the kernel requests are common to all kernels in library 10, the description tables can process kernel requests from any kernel in library 10. The device description tables can execute kernel requests and create adapter requests. The adapter requests include device commands and adapter description table commands. These adapter requests are queued in adapter request queue 11 by kernel 1 synchronous to the operating system 12. Device description tables may also recursively pass control to other device description tables which can add adapter requests to the queue.

Adapter requests can function in a single thread environment with operating system such as MS-DOS, or in a multiple thread environment with other operating systems such as OS/2 and Unix.

Adapter description tables 9 receive adapter requests and process the adapter requests, e.g., process the adapter description table commands and issue the device commands to devices. Adapter description tables can also create adapter commands. The output (i.e. device commands and adapter commands) from adapter description tables 9 can be issued to devices and adapter in accordance with conventional procedures using DMA (Direct Memory Access), PIO (Programmed Input/Output), Bus Master, Memory Map, BIOS (Binary input Output System) or direct register commands on the adapters or in accordance with any other procedures now known or later developed for issuing device commands to devices and/or for issuing adapter commands to adapters. Adapter description tables 9 can operate asynchronous to the operating system and can respond to interrupts. Interrupts and other asynchronous commands are supported by the service routines in service map 6 of kernel 1.

An operating system request interface into kernel 1 is typically included as part of operating system 12. The operating system request interface receives normal operating system requests such as read data and write data and is described in the technical reference manuals for the specific operating system in use. These operating system requests normally vary from operating system to operating system but are translated into common kernel requests by the environmental map 2. These kernel requests are executable by any of the description tables in library 10.

The operating system request interface can also contain an IOCTL interface which can be used to create requests not created by the operating system. These IOCTL requests are a special kind of operating system request and can be processed by the inventive device driver as operating system requests. Vendor created IOCTL request packets are associated with the IOCTL interface and the IOCTL requests. An IOCTL request packet can be referenced by a device description table using a pointer to the IOCTL request packet. The pointer is included in the IOCTL request (operating system request) and in the kernel request issued by the device description table. The implementation of this kernel request is completed by the device description table 8 which uses the IOCTL request packet to create one or more adapter requests (device commands).

Device description tables 8 and adapter description tables 9 can be linked (e.g. attached) to any of the kernels in library 10 in any combination. Description tables operate independently of other description tables. The kernel provides the capability to ensure that each description table operates independently of other description tables. Thus, each description table can be created and tested in a stand alone environment and can be linked to any kernel in library 10 in any sequence and in any combination with other description tables.

In summary, the device driver provides three types of translation functions:

1. The kernel (through its environmental map) translates operating system requests into common kernel requests.

2. Device description tables translate kernel requests into device specific information, e.g. adapter requests, calls to other description tables, etc.

3. Adapter description tables translate adapter requests into adapter specific information, e.g. issuance of device command, etc.

B. Configuration of System

Figure 2:
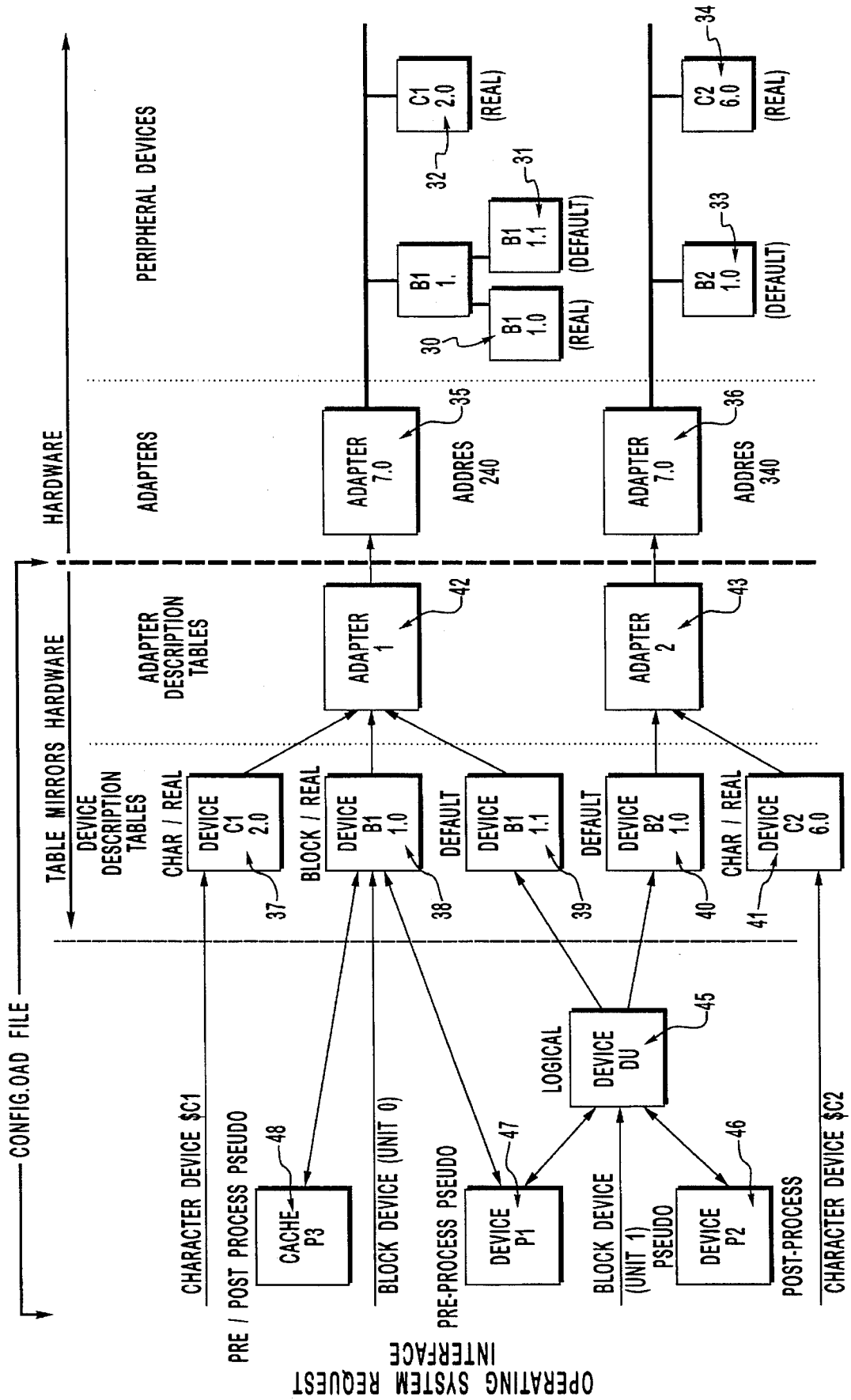
FIG. 2 depicts an example of a system configuration selected by the user and further depicts the connections and relationships among the devices, adapters, device description tables and adapter description tables.

The invention supports considerable configuration flexibility. FIG. 2 represents a sample configuration of a system. As shown in FIG. 2, several devices 30, 31, 32, 33 and 34 are attached to the system through adapter cards 35 and 36. These devices can be any of a wide variety of peripheral devices. For example, device 30 (B11,0) can be a master Bernoulli cartridge drive, device 31 (B11,1) can be a slave Bernoulli cartridge drive, device 32 (C12,0) can be a CD-ROM player, device 33 (B2 1,0) can be a hard disk drive, and device 34 (C2 6,0) can be a helical scan tape drive. The adapters can represent intelligent or nonintelligent SCSI adapters and/or other adapters. For example, adapter 35 can be an Iomega PC2 SCSI adapter and adapter 36 can be an Adaptec intelligent SCSI adapter. In this embodiment of the invention the Small Computer Systems Interface (SCSI) is used between the adapters and devices. In other embodiments of the invention other interfaces (e.g. ESDI, etc.) can be used singularly or in combination. To support the hardware (i.e. the devices and adapters), the invention uses a kernel (shown as kernel 1 in FIG. 1) to which are linked description tables 37, 38, 39, 40, 41, 42 and 43 for the devices and adapters.

As shown in FIG. 2, the description tables for the physical devices and adapters mirror the physical hardware configuration of devices and adapters. An adapter description table is assigned for each adapter 35 and 36, a device description table is assigned for each physical device 30, 31, 32, 33 and 34. Device description table 37 corresponds to device 32. Device description table 38 corresponds to device 30. Device description table 39 corresponds to device 31. Device description table 40 corresponds to device 33.

Device description table 41 corresponds to device 34. Adapter description table 42 corresponds to adapter 35. Adapter description table 43 corresponds to adapter 36. An address representation is made for each of the devices and adapters. In FIG. 2, SCSI interface addressing is used with the SCSI ID, LUN notation. As an example 6,0 represents SCSI ID 6, LUN 0 and is the SCSI interface address of device 34 (C2 6,0). As another example, device 31 (B1 1,1) has a SCSI interface address represented by SCSI ID 1, LUN 1.

An additional level of function is provided by special description tables which are assigned to logical devices and pseudo devices. In FIG. 2, device description table 45 is a logical device description table. Also in FIG. 2, device description tables 46, 47 and 48 are pseudo device description tables. Pseudo device description table 46 provides post-processing (for example decryption). Pseudo device description table 47 provides pre-processing (for example encryption). Pseudo device description table 48 provides both pre-processing and post-processing (for example a peripheral cache). The logical and pseudo device description tables do not mirror the physical devices shown in FIG. 2 because there are no physical devices which correspond directly to these device description tables.

When the operating system presents an operating system request to the kernel the operating system expects one of two types of devices: a character device or a block device. Character devices and block devices are defined in the definitions of Section VI. Associated with each character device (unless it is a default device) is a device name. Associated with each block device (unless it is a default device) is a unit number. In FIG. 2, devices 32 and 34 are character devices having the names $C1 and $C2 respectively. Device 30 is a block device having unit number 0.

Devices 31 and 33 are block devices but do not have unit numbers because they are default devices. Device description tables 39 and 40, which correspond to devices 31 and 33, are attached to logical device description table 45. (Note: "attached" means that description tables are loaded into computer memory and linked to the kernel through entries in the global description table. Device 31 and its description table 39 are not assigned a unit number by the operating system. Device 33 and its description table 40 are not assigned a unit number by the operating system. Devices 31 and 33 are default devices because they are not assigned a unit number or character name by the operating system. Thus description tables 39 and 40 are default device description tables.

Devices 30, 32 and 34 are "real devices" because they are physical devices to which the operating system has assigned a unit number or character name. In FIG. 2, device 30 has been assigned unit number 0 and devices 32 and 34 have been assigned character names $C1 and $C2, respectively.

A "logical" device is represented by a device description table which is attached to the operating system (i.e. has a unit number or character name assigned to it) but does not have a physical device directly associated with it. Logical devices (and logical device description tables) are supported by one or more default devices (and default device description tables). Represented in FIG. 2, is a logical device description table 45 which performs a function such as duplex writing to two more storage devices (default devices 31 and 33). In this example, the logical device description table is linked to the operating system as a unit, i.e., the operating system has assigned unit number 1 to logical device description table 45. When the operating system instructs the logical device description table to write data, the logical device description table sends instructions to two different default device description tables 39 and 40. Description tables 39 and 40 write the same data to two different peripheral devices 31 and 33.

An additional type of device description table is the pseudo device description table. In FIG. 2, description tables 46, 47 and 48 are pseudo device description tables. Psuedo device description tables represent the functions responsible for the pre-processing and post-processing of data. Pseudo device description tables perform special data processing functions where the data from the system is pre-processed before it goes to a peripheral device or is post-processed as it is read from a peripheral device. Note from FIG. 2, the pre- and post-processing table functions (i.e. pseudo device description tables 46, 47 and 48) can be assigned to one or more different device description tables. These assigned device description tables can be real or logical. In FIG. 2, pseudo device description table 46 is assigned to logical device description table 45, i.e., post-processes data from logical device 45. Pseudo device description table 47 is assigned to real device description table 38 and to logical device description table 45 and pre-processes data to device 30 and logical device 45. (Note: the pre-processing of data to logical device 45 results in the pre-processing of data to devices 31 and 33). Pseudo device description table 48 is assigned to real device description table 38 and pre-processes data to, and post-processes data from, device 30.

FIG. 2 represents the system configuration that is used as an example in the following description of this embodiment or example the invention. The invention is not limited to or by this configuration.

C. Device Driver Environment

The kernel is operating system dependent, i.e., the kernel satisfies the operating system's requirements for a device driver. These requirements are known to persons of ordinary skill in the art and are typically set forth in the device driver documentation published for the operating system. The requirements are different for different operating systems. Such requirements include specific request structures and device driver headers. Some operating systems require an I/O control interface.

The requirements for specific request structure is satisfied by the environmental map of the kernel (i.e., the environmental map translates operating system requests into kernel requests that can be processed by device description tables). If the operating system requires an I/O control interface then the kernel can include an I/O control interface. The I/O control interface translates I/O control requests from the operating system or applications into an I/O control kernel request which is a special kind of kernel request that can be processed as a kernel request.

A primary requirement for MS-DOS and OS/2 device drivers is that they must have a device driver header compatible with the operating system. Device driver headers are used to create a forward-linked list of the user-installed device drivers in the system. This list of device drivers contains both block and character device drivers.

The kernel can manage a plurality of block and character devices. The kernel is able to perform this task by statically linking a set of character device driver headers that have their strategy routine and interrupt routine pointers initialized to a set of null routines. The statically linked character device driver headers also link to a single block device driver header.

The character device driver headers are initialized during the kernel initialization process if any character device description tables are defined in the configuration file (CONFIG.OAD). The block device driver header is initialized after the last of the block device description tables is loaded into computer memory. At this time it is possible to determine the number of block devices that have been specified in the configuration file. Therefore, after the block device description tables have been loaded, the block device driver header is initialized to reflect the actual number of block devices configured in the system.

Because the kernels in this embodiment of the invention were developed in the C programming language, the order of the data and code were not in conformance with the device driver requirements of the MS-DOS and OS/2 operating systems. This problem was solved by re-ordering the data and code segments in the kernel.

There is a need for a mechanism that will allow description table files to be opened and read during the kernel device driver initialization process and that will provide other initialization functions. These initialization functions are performed by initialization routines contained in the kernel initialization map.

There is also a need for a mechanism to handle low-level operating system specific operations such as memory allocation and address translation. The kernel's service map serves as this mechanism by providing service routines to the kernel and description tables. In this embodiment of the invention, the service routines are DevHlp routines.

In Unix and MS-DOS, DevHlp routines do not exist. Therefore, a set of DevHlp routines are provided in the service map of the MS-DOS and Unix kernels for use in initialization and operation. In OS/2, the DevHlp routines are part of the OS/2 operating system. Therefore, the service map of the OS/2 kernel provides the addresses of these DevHlp routines so that they can be called when needed.

A description table is operating system independent, meaning that it can be linked to a plurality of different operating systems. The description table is linkable to the MS-DOS operating system through an MS-DOS compatible kernel. The description table is linkable to the OS/2 operating system through and OS/2 compatible kernel. The description table is linkable to the Unix operating system through a Unix compatible kernel. Etc.

A device description table for a device satisfies requirements of the device for a device driver. These requirements require that the device description table create device commands that are compatible with (i.e. supported by) the device. Different devices may have different device commands. For example, a tape drive has a "rewind" command and a CD-ROM has "open and close drawer" commands. The device command must also be in a command format compatible with the device. Other requirements may include sector sizes and layouts and block/character addressing modes or formats. The requirements of a device for a device driver are known to persons of ordinary skill in the art and are typically described in technical reference documentation published for the device.

An adapter description table for an adapter satisfies requirements of the adapter for a device driver. These requirements are also known to persons of ordinary skill in the art and are typically described in technical documentation published for the adapter. Such requirements can include the method or mode of device command issuance to a device, the method or mode of data transfer to a device, and interrupt level.

D. Global Data Structure and Data Structures

The inventive device driver includes a plurality of software modules called description tables. These description tables are device description tables and adapter description tables. The description tables are linked to each other and to the kernel through the global data structure 4 (see FIG. 1). As shown in FIG. 1, the kernel contains the global data structure. As each description table is linked to the kernel, information relevant to the description table is set into the global data structure to complete the linkage. A description table can be linked to the kernel by loading the description table into the computer's memory (e.g. random access memory) and by entering information relevant to the table into the data structure. The description tables are linked to the kernel and, therefore, are linked by the kernel to the operating system.

Figure 3A:
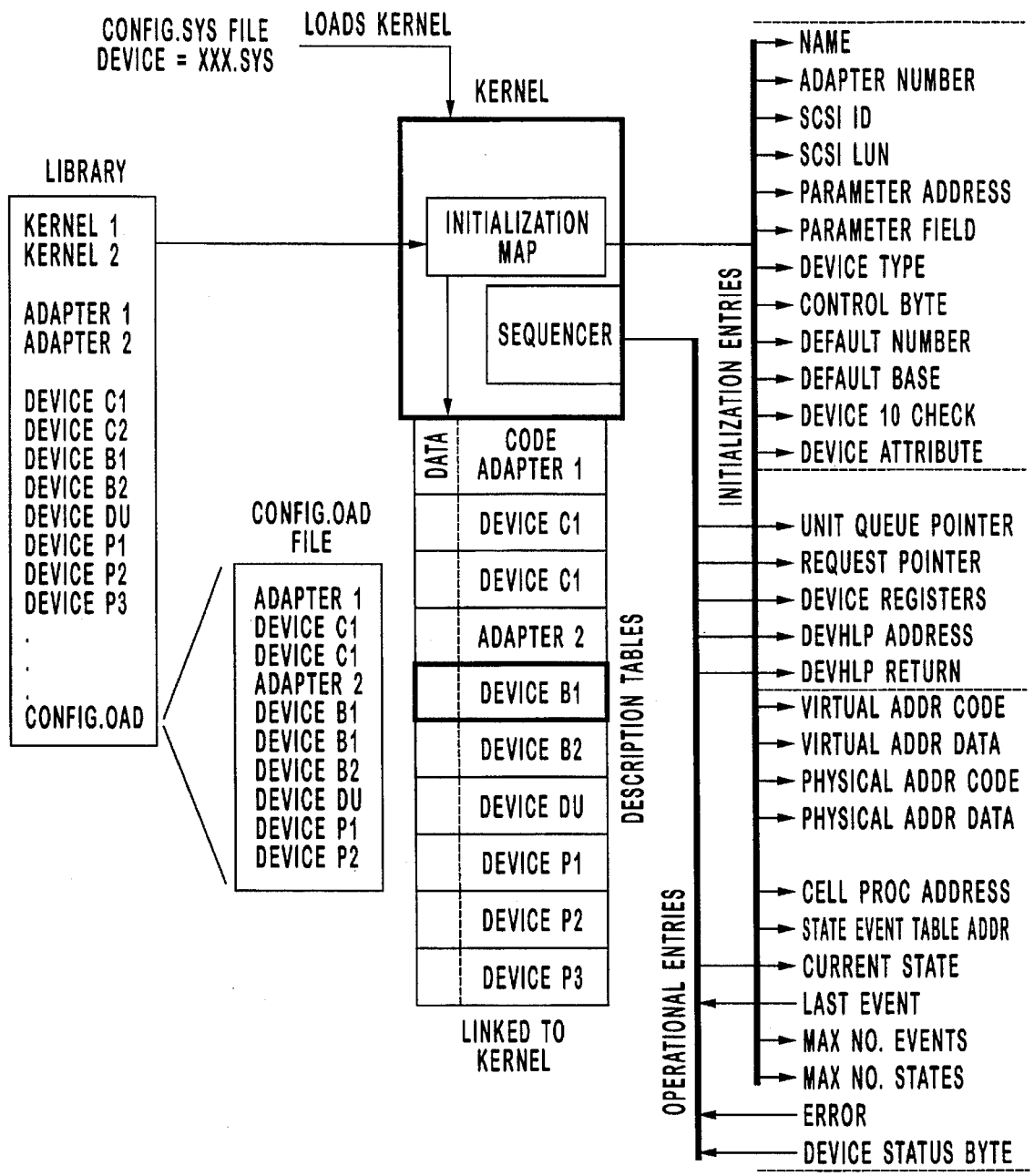
FIG. 3 depicts a global data structure which serves as an interface between the kernel and the description tables.
Figure 3B:
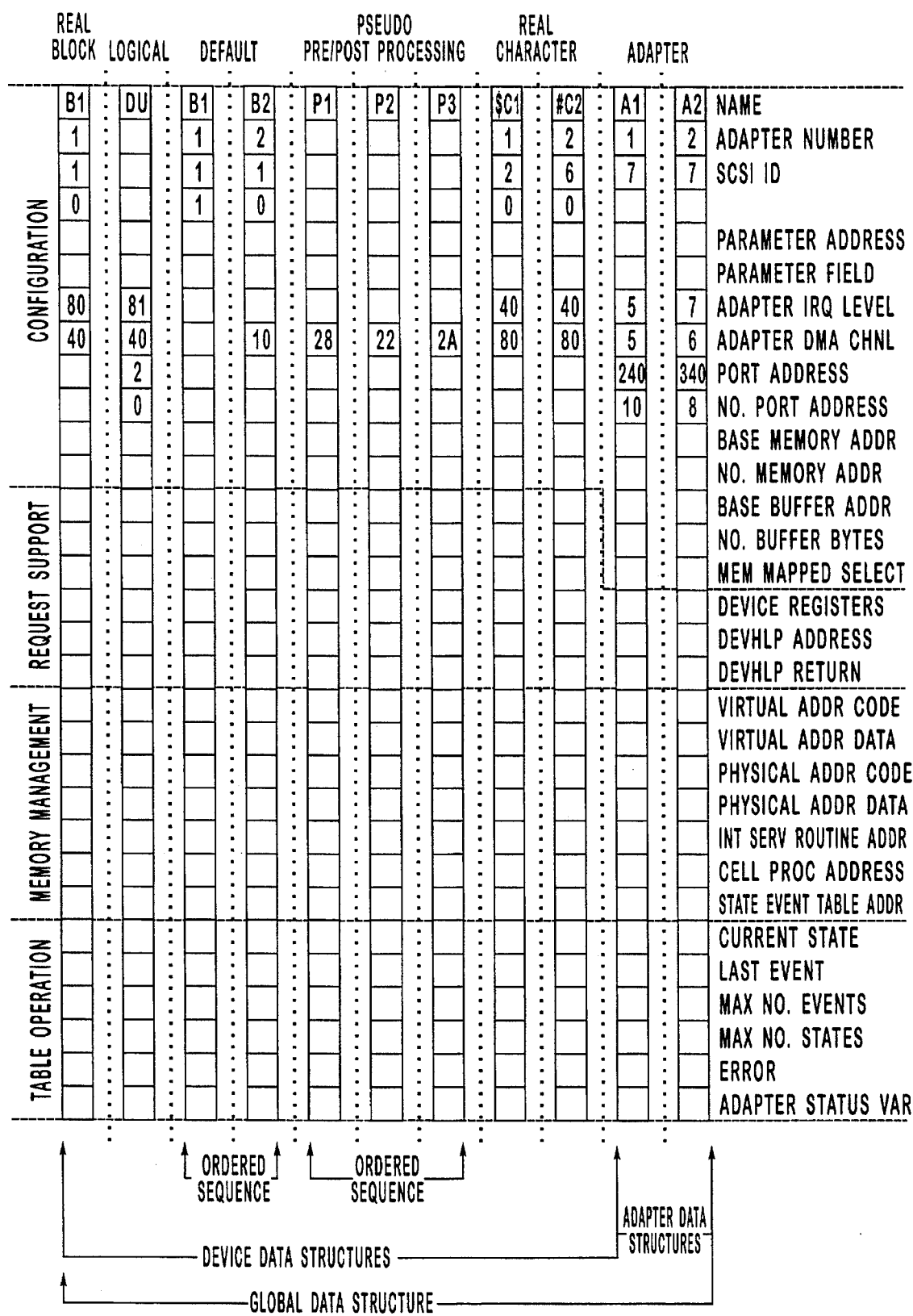

A sample global data structure ("GDS") is shown in FIG. 3. Each device and adapter attached to the system is represented in the global data structure of FIG. 3 as a vertical column of data fields. Each such vertical column represents the "data structure" of a device or an adapter. It is also proper to state that each such vertical column represents the data structure of a device description table or an adapter description table. The device data structure (or adapter data structure) represents the interface between the kernel and the description table of the device (or adapter). The entries to these fields are information in the form of integers, addresses, arrays or other data. Some fields are unique to the support of devices. Other fields are unique to the support of adapters. Yet other fields are common to both devices and adapters. The data structure fields shown in FIG. 3 for device data structures are identified and described in Table 1 of Section VIII. The data fields shown in FIG. 3 for adapter data structures are identified and described in Table 2 of Section VIII. If an adapter field entry has already been described in Table 1 under a field entry for device data structures the description is not repeated and reference is made to Table 1.

A device data structure has fields into which device information can be entered. Device information can be some or all of the following: device configuration information, device request support information, device memory management information, and device table operation information. An adapter data structure has fields into which adapter information can be entered. Adapter information can be some or all of the following: adapter configuration information, adapter request support information, adapter memory management information, and adapter table operation information. Information for a data structure can be any information which contributes to the linkage of the description table to the operating system, the kernel, or another description table.

In the example of FIG. 3, each data structure includes the following segments:

1. Configuration. The "configuration" segment contains configuration information. For a device, device configuration information can include information identifying the device name (e.g. NAME field), information identifying an adapter to which the device is attached (e.g. ADAPTER NUMBER field), device address information (e.g. SCSI ID and SCSI LUN fields), information identifying the kind of device (e.g. CONTROL BYTE field), information for defining pseudo device relationships (e.g. DEVICE TYPE field), information for defining logical device relationships (e.g. DEFAULT NUMBER and DEFAULT BASE fields), and other configuration information. In this embodiment of the invention, device configuration information is the information entered into the following fields:

NAME
ADAPTER NUMBER
SCSI ID
SCSI LUN
PARAMETER ADDRESS
PARAMETER FIELD
DEVICE TYPE
CONTROL BYTE
DEFAULT NUMBER
DEFAULT BASE
DEVICE ID CHECK
DEVICE ATTRIBUTE

In other embodiments of the invention, device configuration information can be some or all of the information for these fields or other information of a similar kind or which serves a similar purpose. For an adapter, the adapter configuration information can include information identifying the adapter name (e.g. NAME field), information identifying the adapter number (e.g. ADAPTER NUMBER field), adapter address information (e.g. SCSI ID field) and other configuration information. In this embodiment of the invention, adapter configuration information is the information entered into the following fields:

NAME
ADAPTER NUMBER
SCSI ID
PARAMETER ADDRESS
PARAMETER FIELD
ADAPTER IRQ LEVEL
ADAPTER DMA CHANNEL
PORT ADDRESS
NUMBER PORT ADDRESSES
BASE MEMORY ADDRESS
NUMBER MEMORY ADDRESSES
BASE BUFFER ADDRESS
NUMBER BUFFER BYTES
MEMORY MAPPED SELECTOR

In other embodiments of the invention, adapter configuration information can be some or all of the information for these fields or other information of a similar kind or which serves a similar purpose.

2. Request Support. The "request support" segment contains kernel request support information. In this embodiment of the invention, device request support information is the information entered into the following fields:

UNIT QUEUE POINTER
REQUEST POINTER
DEVICE REGISTERS
DEVHLP ADDRESS
DEVHLP RETURN

In this embodiment of the invention, the request support segment of an adapter data structure has all of these fields except for the UNIT QUEUE POINTER and REQUEST POINTER fields. Adapter request support information is the information entered into the adapter request support fields. In other embodiments of the invention, device request support information (and adapter request support information) can be some or all of the information for these fields or other information of a similar kind or which serves a similar purpose.

3. Memory Management. The "memory management" segment contains memory management information. In this embodiment of the invention, device memory management information is the information entered into the following fields:

VIRTUAL ADDRESS CODE
VIRTUAL ADDRESS DATA
PHYSICAL ADDRESS CODE
PHYSICAL ADDRESS DATA
CELL PROCESSOR ADDRESS
STATE EVENT TABLE ADDRESS

In this embodiment of the invention, the memory management segment of an adapter data structure has all of these fields plus an INTERRUPT SERVICE ROUTINE ADDRESS field. Adapter memory management information is the information entered into the adapter memory management fields. In other embodiments of the invention, device memory management information (and adapter memory management information) can be some or all of the information for these fields or other information of a similar kind or which serves a similar purpose.

4. The "table operation" segment contains table operation information. In this embodiment of the invention, device table operation information is the information entered into the following fields:

CURRENT STATE
LAST EVENT
MAX NUMBER EVENTS
MAX NUMBER STATES
ERROR
DEVICE STATUS BYTE

In this embodiment of the invention, the table operation segment of an adapter data structure has all of these fields except that an ADAPTER STATUS VARIABLE field replaces the DEVICE STATUS BYTE field. Adapter table operation information is the information entered into the adapter table operation fields. In other embodiments of this invention, device table operation information (and adapter table operation information) can be some or all of the information for these fields or other information of a similar kind or which serves a similar purpose.

Tables 1 and 2 of Section VIII describe various kinds of configuration, request support, memory management and table operation information for the above-identified device and adapter data structure fields.

A device data structure can be a real device data structure, a logical device data structure, a default device data structure, or a pseudo device data structure. In FIG. 3, the first vertical column of the global data structure is a real device data structure (for a block device) and represents the interface between the kernel 1 and device description table 38 (see FIG. 2). This real device data structure is associated with a block device (i.e. device 30 in FIG. 2) and is assigned unit number 0 from the units array (see FIG. 3) because this is the unit number assigned by the operating system to the real device (i.e. device 30). The second vertical column of the global data structure shown in FIG. 3 is a logical device data structure and represents the interface between the kernel 1 and logical device description table 45 (see FIG. 2). This logical device data structure is assigned unit number 1 from the units array (see FIG. 3) because this is the unit number assigned by the operating system to logical device 45. The third and fourth vertical columns of the global data structure of FIG. 3 are default device data structures and represent the interfaces between the kernel and default device description tables 39 and 40. Because the corresponding devices (i.e. devices 31 and 33 in FIG. 2) are default devices, unit numbers are not assigned to the devices or the default device data structures. Note, however, that the default device data structures are ordered in an ordered sequence (see FIG. 3). The fifth, sixth and seventh vertical columns of the global data structure of FIG. 3 are pseudo device data structures and represent the interfaces between the kernel 1 and pseudo device description tables 46, 47 and 48. Unit numbers are not assigned to pseudo device data structures. Note, however, that the pseudo device data structures are ordered in an ordered sequence (see FIG. 3). The eighth and ninth vertical columns of the global data structure of FIG. 3 are real device data structures (for character devices) and represent the interfaces between the kernel 1 and device description tables 37 and 41 (see FIG. 2). These real device data structures are associated with character devices (i.e. devices 32 and 34 in FIG. 2). Accordingly, character names $C1 and $C2 (see FIG. 3) are assigned to these data structures by the kernel as defined by the configuration file. The last two columns of the global data structure of FIG. 3 are adapter data structures and represent the interfaces between the kernel 1 and adapter description tables 42 and 43 (see FIG. 2). These adapter data structures are associated with adapters 35 and 36 (see FIG. 2).

As each device or adapter is identified through the configuration file (CONFIG.OAD) during initialization, an entry is placed into the units array, character array or adapter array (see FIG. 3). These entries are used by the kernel to identify each vertical column (i.e. device or adapter data structure) in the global data structure. Note from FIG. 3, however, that this does not apply to default devices and pseudo devices. Only real and logical devices are assigned entries in the unit array or character array. Default and pseudo devices are not assigned a unit or character array entry. Instead, the data structures of these device types are "ordered" as shown in FIG. 3. The ordering of the default device data structures is used by the kernel in combination with the CONTROL BYTE of the logical device data structure and DEFAULT NUMBER and DEFAULT BASE fields the default device data structures to select the appropriate default device assigned to the logical device. Activation of pseudo devices is determined by the CONTROL BYTE field and the DEVICE TYPE field.

FIG. 3 shows the linking of the selected description tables to the kernel as part of the kernel initialization process. As the kernel executes its initialization map, it reads the configuration file (CONFIG.OAD) to determine the system configuration selected by the user. As each description table file is identified by the configuration file, information is placed into the global data structure as required to support the linking of the description table. The kernel's initialization map reads the configuration file (CONFIG.OAD). For each description table identified in the configuration file, the corresponding description table file is read from library 10 and linked to the kernel by the initialization map. It should be noted that description tables are prepared as independent modules and remain as such when linked to the kernel. Communication between the description tables and the kernel is through entries in the global data structure which is the interface between the kernel and each description table. This global data structure is the table interface. The kernel's initialization map sets up these entries and uses information from the configuration file (CONFIG.OAD), the description tables and the operating system to establish entries in the global data structure.

The global data structure exists in the kernel in a blank form (i.e. there are no entries in the fields of the global data structure) when the kernel is first initialized. In this embodiment of the invention there are defined in the kernel's global data structure space for 16 real or logical device data structures, 4 pseudo device data structures, 8 default device data structures and 4 adapter data structures. Thus, this global data structure can support up to 16 real or logical device description tables or devices, 4 pseudo description tables or devices, 8 default device description tables or devices and 4 adapter description tables or adapters. It is not necessary that all available data structures be used. In this particular embodiment of the invention it is seen from FIGS. 2 and 3 that only 4 (of a possible 16) real/logical device data structures are needed (for description tables 37, 38, 41 and 45 and for real block device 30, real character devices 32 and 34 and logical device 45), that only 3 (of a possible 4) pseudo device data structures are needed (for pseudo device description tables 46, 47 and 48), that only 2 (of a possible 8) default device data structures are needed (for default device description tables 39 and 40 and for default devices 31 and 33), and that only 2 (of a possible 4) adapter data structures are needed (for adapter description tables 42 and 43 and for adapters 35 and 36). The global data structure of FIG. 3 does not show the unused and unneeded data structures, i.e., only data structures for the device and adapter description tables actually used (see FIG. 2) are shown in FIG. 3. Other embodiments of the invention can define or allocate global data structure space (i.e. data structures) for other numbers of devices and adapters.

The configuration file (CONFIG.OAD) contains records identifying the devices and adapters required or selected by the user for the system. Each record identifies a specific device or adapter. Each record of the configuration file contains the name of the device or adapter description table file that is to be loaded and linked to the kernel. The configuration file (CONFIG.OAD), is contained in library 10 together with the available kernels and description tables. In this example, the library is a directory named OAD. The description tables contain the following information. Each description table contains a data segment and a code segment. The code segment contains executable computer programs (e.g. software routines). The description table file also contains a header which contains pointers to the location of the data and code segments in the file as well as the size of the data and code segments. The initialization map of the kernel uses this header with its pointers and segment size information to load the description table into the computer memory (e.g. RAM) and to set up address pointer entries in the data structure associated with the description table. These address pointers are the addresses in the computer memory (e.g. RAM) of the locations of the code and data segments of the description table after it has been loaded into the computer memory. These address pointers are entered into the "memory management" fields of the data structure.

User configuration information which is contained in the configuration file (CONFIG.OAD) and which is entered into the global data structure provides a representation of the configuration of the user's system as shown in FIG. 2. The entries in the global data structure of FIG. 3 correspond to the specific configuration map shown in FIG. 2. The user's configuration data is contained in the configuration file (CONFIG.OAD) which is used by the kernel to provided entries into the global data structure. As in the example of FIG. 3, the configuration file (CONFIG.OAD) contains the names of the devices and adapters to be used. The information from the configuration file (CONFIG.OAD) is entered by the initialization map into the global data structure as part of the kernel initialization process. The configuration file (CONFIG.OAD) provides information to the initialization map for initialization of the kernel. Configuration file information is entered into the data structure fields to which the arrows extending from the "Initialization Entries" bar point as shown in FIG. 3.

E. Device Description Tables, Adapter Description Tables and Adapter Requests

A device description table can process a kernel request issued by the kernel. A device description table can have an action list of action routines (sometimes referred to as device action routines) and a means for selecting an action routine from the action list in response to the kernel request. The selected action routine can be executed by the digital computer to cause an action routine function (sometimes referred to as a device action routine function). One kind of action routine function is the creation of an adapter request. Although a single action routine can create an adapter request it is possible to use a plurality of action routines to create an adapter request (and such plurality of action routines are deemed equivalent to such single action routine).

An adapter description table can process an adapter request. An adapter description table can have an action list of action routines (sometimes referred to as adapter action routines) and a means for selecting an action routine from the action list in response to the kernel request. The selected action routine can be executed by the digital computer to cause an action routine function (sometimes referred to as an adapter action routine function). One kind of action routine function is the issuance of a device command to a device.

As shown in FIG. 4, device and adapter description tables can be of a similar structure. Each includes a state machine cell processor (Cell Proc), a state event table and an action list of computer programs or routines. The adapter description tables (but not the device description tables) can also include an interrupt processing program (Int Proc).

A standard description table format is defined for the description tables in library 10. A standard format allows a common table interface (e.g. global data structure) to be defined between the kernel and the description tables. The standard description table format selected for a given embodiment of the invention can be selected from a wide variety of formats. The format selected for this embodiment of the invention is described below. It should be noted that in this embodiment of the invention, the description tables are developed in a subset of the ANSI standard C language, and, therefore, the file format of the description tables must be able to address the aspects of this type of compiler output.

Figure 11:
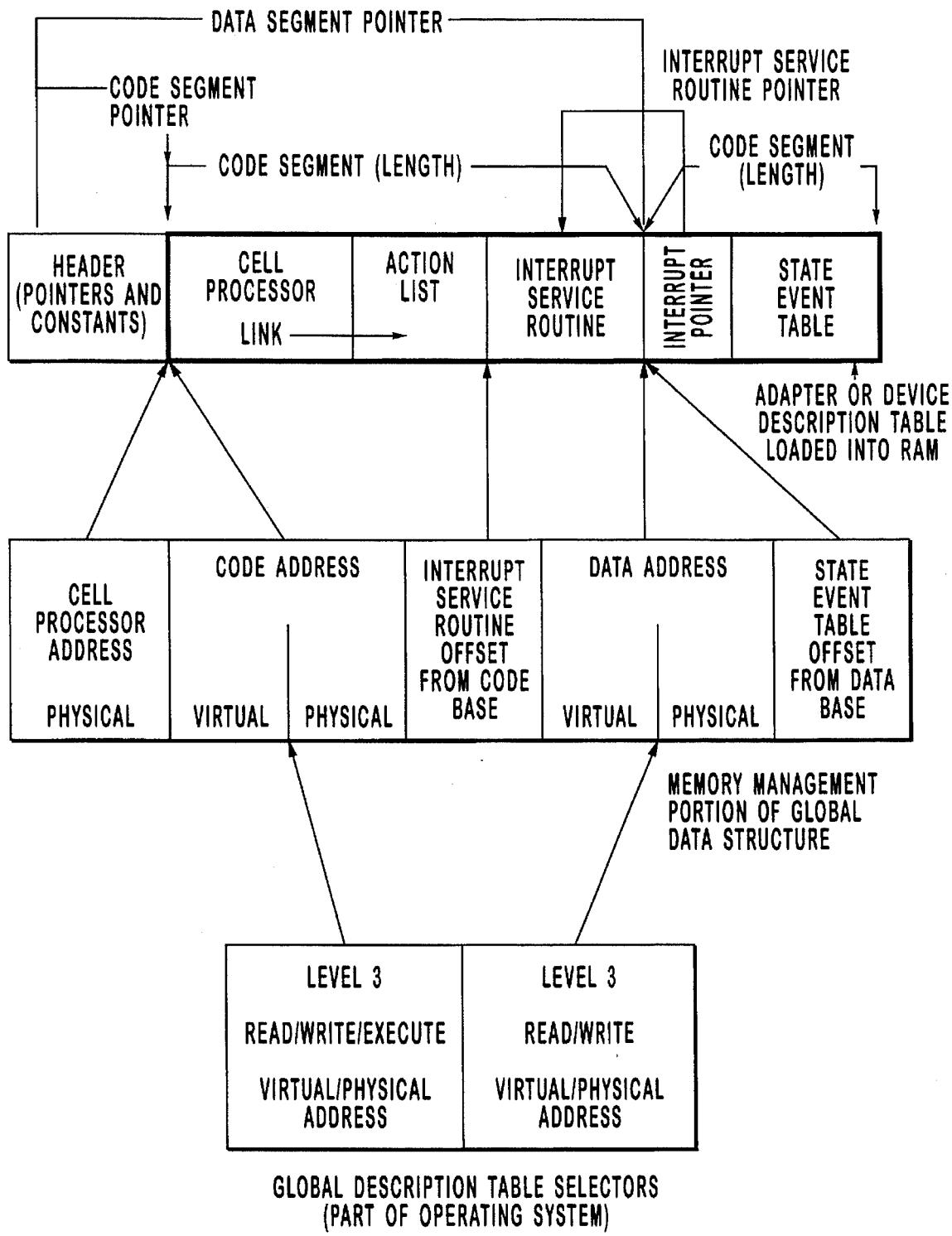
FIG. 11 depicts a device or adapter description table, the memory management portion of the global data structure, and global description table selectors.

A description table implements a state machine and includes two type of information, a code segment (computer program routines) and a data segment which contains data for the state event table. A description table is converted to a loadable description table file by concatenating a header to the description table. In addition, each of the code and data segments contain additional substructures. FIG. 11 shows the relationship between the substructures of the description table and the memory management portion of the global data structure. As also shown in FIG. 11, when the operating system operates in protected mode, a pair of selectors which are a part of the operating system's global description table (GDT), are assigned for each device or adapter description table.

As shown in FIG. 11, the description table code segment has three parts, a cell processor, an action list and an interrupt service routine. The cell processor is a state machine routine which interprets the contents of the state event table. This state machine provides a common format and structure whereby the global data structure can be used to link several independent loadable device or adapter description tables to the kernel. Associated with the cell processor is an action list which is a list or group of computer programs or routines which are referred to herein as action routines. The third portion of the description table code segment is the interrupt service routine. The interrupt service routine is part of the code segment of adapter description tables but is not included in device description tables (i.e. the code segment of device description tables only has the cell processor and action list). The interrupt service routine is executed when an interrupt for the adapter occurs.

The data segment of the description table shown in FIG. 11 contains the state event table. The state event table can be a two dimensional matrix with columns representing different events and with rows representing different states. At the intersection of each state and event is a cell which contains two entries. One entry is representative of the action that is desired. The other entry is the next state which should be used after completion of the action defined for the cell. The data segment also contains a pointer to the interrupt service routine. In particular, the data segment contains in a specific location, the offset address of the interrupt service routine in the code segment.

The memory management section of the adapter or device data structure contains addresses to different parts of the description table code and data segments. The fields of the memory management section of the global data structure are as follows.

VIRTUAL ADDRESS CODE
VIRTUAL ADDRESS DATA
PHYSICAL ADDRESS CODE
PHYSICAL ADDRESS DATA
INTERRUPT SERVICE ROUTINE ADDRESS (adapters only)
CELL PROCESSOR ADDRESS
STATE EVENT TABLE ADDRESS Addresses for the code and data segments are contained in both virtual and physical format. The virtual format of an address is used with operating systems such as OS/2 and Unix which work in a multi-tasking protected mode. The CELL PROCESSOR ADDRESS is contained in the global data structure as a direct physical address in addition to a virtual address because the description table is not swapped in and out in a multi-tasking operating system such as OS/2 as it is part of a device driver. The addresses of the interrupt service routine and state event table are stored in the global data structure as offsets from the base addresses of the code and data segment pointers. These offsets are calculated by the initialization map based on the contents of the interrupt pointer field in the data segment and the fixed offset of the state event table from the data segment pointer based upon the fixed length of the interrupt pointer. Selectors, which are part of the operating system, are assigned to each description table and contain addresses to the code and data segments in both physical and virtual address formats.

The device description tables can operate synchronously to the operating system. The device description tables include action routines which can be executed to cause an action routine function. One such function performed by device description tables is the creation of adapter requests. Adapter requests can include device commands and adapter description table commands. Adapter description table commands define functions to be performed by the adapter description tables. When adapter requests are processed by adapter description tables, the adapter description table commands are processed and the defined functions are performed. The processing of adapter description table commands can result in the execution of action routines of the adapter description table. The execution of such action routines cause action routine functions such as the creation of adapter commands, the issuance of adapter commands to adapters and the issuance of device commands to devices. Adapter description tables can operate asynchronously to the operating system and respond to interrupts. The asynchronous operation of the adapter description tables is controlled through adapter requests.

In FIG. 1, a queue 11 of adapter requests is shown. FIG. 5 also represents this queue and provides greater detail of the structure of an adapter request by identifying the fields of an adapter request. These fields are identified and described in Table 3 of Section VIII. This adapter request structure is the adapter request structure of this embodiment or example of the invention. Other embodiments of the invention can have different structures.

The adapter request is the communication between the device description table and the associated adapter description table. The device description table is designed to accept the kernel request and then determine the appropriate sequence of operations to be performed by the adapter to accomplish the request. If it is determined that the physical device, via the adapter, must be involved in the operation, then the device description table creates the appropriate sequence of one or more adapter requests to be passed to the adapter description table for processing. The adapter requests include one or more device commands. The adapter description table issues the the device command(s) through the adapter to the device. This is depicted in FIG. 1 where a queue 11 of adapter requests is formed from the output of a device description table 8. These adapter requests are passed from queue 11 to the adapter description table 9 associated with the adapter that supports the device to which the request is directed and to which the device command is issued.

The adapter request is comprised of a plurality of fields into which information is entered. This information will be used by the adapter description table to process the adapter request. In addition, certain adapter request fields contain other information such as a device command and the address of the data buffer (see data buffer 15 in FIG. 1) when data is to be read from or written to a device. The adapter description table uses this data buffer in transferring data between computer memory and the device.

As an example, for a SCSI device, each device has a pre-defined set of SCSI Command Description Blocks (CDBs) which are suggested by the American National Standards Institute (ANSI) and published by the manufacturer of the device. ANSI gives the basic structure and suggested contents of the CDB. The manufacturer of the device gives the specific contents of the CDB for its device. The CDB is a device command.

Since the device description table is specific to a particular device, the device description table creates the CDB (i.e. the device command) as required by the device to perform the desired action. This CDB (i.e. device command) is placed by the device description table into the CDB AREA field (i.e. device command field) of the adapter request. Since the ANSI SCSI standard allows for variable length CDBs, the device description table also places the length of the CDB into the LENGTH OF CDB field of the adapter request.

The adapter description table does not modify or use the contents (i.e. device command) of the CDB AREA field of the adapter request. Instead, the adapter description table passes (i.e. issues) the contents (i.e. device command) of the CDB AREA field directly to the device. This removes device specific actions from the adapter description table. Thus, the adapter description table can be used with a plurality of different devices. Conversely, since the adapter description table does not modify or use the contents of the CDB AREA field, a single device description table can be used with a plurality of different adapter description tables. Thus the "mix and match" capability of this invention between devices and adapters is achieved. The CDB AREA field for a non-SCSI device, such as an ESDI device, will contain a device command required for and compatible with the ESDI device. The adapter description table does not modify or use the contents of this field except to issue it to the device through the adapter.

The operating system request and the kernel request indicate the device to which the request is directed. The device description table creates an adapter request in response to the kernel request. The adapter request contains device specific information but no adapter specific information. The kernel selects the adapter description table to which the adapter request is sent by referring to the ADAPTER NUMBER field of the device data structure for the indicated device. For example, if device 30 is indicated by the operating system, then the kernel refers to the ADAPTER NUMBER field of device 30's device data structure which is represented by the first vertical column in the global data structure of FIG. 3. The entry in the ADAPTER NUMBER field is 1. With this information, the kernel selects adapter description table 42 because the adapter data structure associated with adapter description table 42 also has 1 as the entry in its ADAPTER NUMBER field (see the tenth vertical column of the global data structure of FIG. 3). Adapters and adapter description tables are numbered in the adapter array. As part of the initialization process the appropriate number for a given adapter (and adapter description table) is entered from the configuration file (CONFIG.OAD) into the ADAPTER NUMBER field of the adapter data structure associated with the adapter (and the adapter description table). For each physical device associated with an adapter (in this example devices 30, 31, 32, 33 and 34) the ADAPTER NUMBER field of the device data structure associated with the device (and with the device's description table) has an entry which indicates the adapter number of the adapter (and adapter description table) associated with the device. As part of the initialization process the appropriate adapter number for a given device (and device description table) is entered from the configuration file (CONFIG.OAD) into the ADAPTER NUMBER field of the device data structure associated with the device (and the device description table). As described above, an adapter request is an output from a device description table. The adapter request is sent to the adapter description table indicated by the device data structure associated with the device description table from which the adapter table request packet was sent.

This strategy allows a device description table to be used with a plurality of different adapter description tables, i.e., the configuration file for one configuration can associate the device description table with one adapter description table and a different configuration file for a different configuration can associate the device description table with a different adapter description table. Thus it is not necessary to create a different device description table for each adapter or adapter description table. This strategy also allows a single adapter description table to support a plurality of device description tables. Thus, the user can combine into the user's system configuration a selection of device description tables and adapter description tables as needed to support the user's physical devices and adapters.

The adapter description table requires no device specific information from the adapter request, thus the adapter description table is device independent and can function with a plurality of different devices. The adapter description table passes the device command (i.e., contents of the CDB AREA field) directly through the adapter to the physical device. The device description table creates the adapter request in an independent manner and thus a single device description table can be used with a plurality of adapter description tables in different configurations. A plurality of device description tables can be used with each of a plurality of adapter description tables allowing various combinations to be used and selected by the user. In addition, a plurality of device description tables can create adapter requests for a single adapter description table thus providing for the functioning of a plurality of devices on a single adapter. The configuration file (CONFIG.OAD) defines which device description tables are connected through the global data structure to each adapter description table.

F. Initialization Map and Initialization Routines

The initialization map is a means for providing initialization routines to the kernel that are needed for initialization (loading) of the inventive device driver. In this embodiment of the invention, five OS/2 API calls or routines (Application Programming Interface calls or routines) are used as initialization routines. Because these API calls are included in the OS/2 operating system, the initialization routines of the OS/2 kernel's initialization map are routines which, when executed, call the needed API call in the OS/2 operating system. For other operating systems, such as MS-DOS and Unix, which do not have these API calls, the API calls are included in the initialization map as the initialization routines. The initialization routines (or API calls) are as follows:

DosRead

DosClose

DosOpen

DosChgFilePtr

DosPutMessage

A more complete discussion of the OS/2 Application Programming Interface (API) and the API calls is presented in the OS/2 Technical Reference Manual available from Microsoft Corporation.

The initialization routines are used during device driver initialization time. Since the kernel is the portion of device driver responding to initialization commands from the operating system, only the kernel needs to have access to the initialization routines. The description tables do not utilize any of the initialization routines because the description tables are not executed until after the device driver initialization process is complete.

G. Initializing and Loading

The initialization and loading of the inventive device driver begins with the existence of a library of kernels, device description tables and adapter description tables. The user creates a configuration file (CONFIG.OAD) which identifies the device description tables and adapter description tables needed to support the devices and adapters of the system configuration selected by the user. The configuration file also provides additional configuration information. Configuration information from the configuration file is entered into the global data structure. The configuration file is comprised of configuration records for the devices and adapters selected. The fields or contents of a configuration record are shown on Table 5 in Section VIII. The configuration file also contains installation specific information such as the device address (e.g. SCSI ID and SCSI LUN fields) assigned to each device and the interconnection of real, logical, default and pseudo devices (e.g. DEVICE TYPE, CONTROL BYTE, DEFAULT NUMBER and DEFAULT BASE fields).

The initialization of the inventive device driver is preceded by the normal operating system procedure of loading a device driver through a system configuration file which for MS-DOS and OS/2 is the CONFIG.SYS file. This file is recognized by the operating system. The standard OS/2 and MS-DOS method of defining an external device driver is to use a DEVICE=XXX.SYS statement in the CONFIG.SYS file. In this example, XXX.SYS is the name of a kernel and so the statement may read DEVICE=KERNEL1.SYS.

The kernel meets the requirements of a loadable device driver. A kernel is created for each needed or selected operating system. Thus the specific device driver requirements of an operating system are met by the kernel created for that operating system. For some operating systems such as Unix which do not support loadable external device drivers, the kernel can be linked to the operating system. The linked combination is then loaded into computer memory. Either way, the kernel (separately or in combination with the operating system) is loaded into computer memory.

Figure 9:
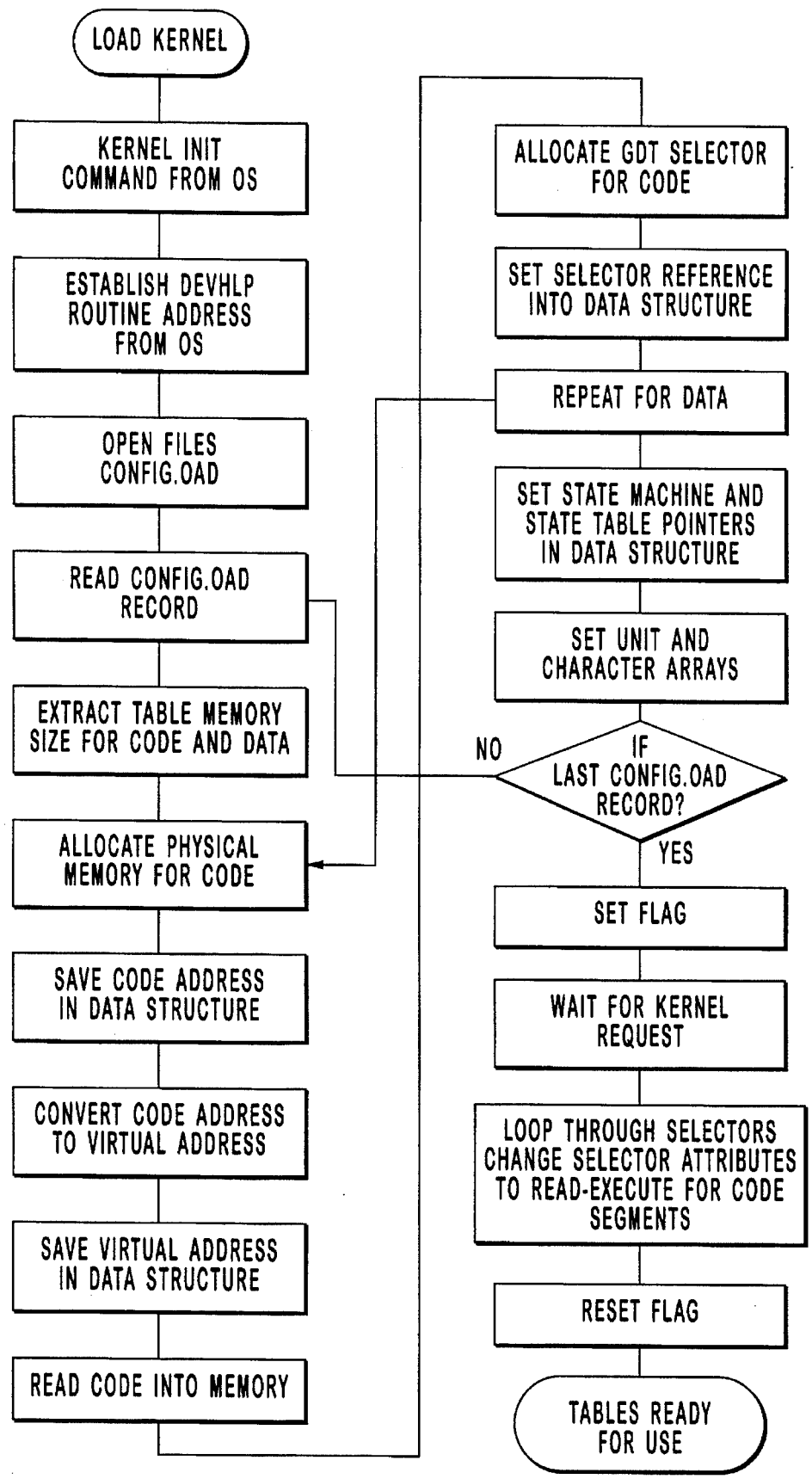
FIG. 9 depicts a flow chart describing the steps associated with the initialization and loading of the inventive device driver.

After the kernel is loaded by (or with) the operating system, the initialization process and the active role of the kernel begin. As part of the loading of a device driver, the operating system issues an initialization command to the device driver. In this case, the operating system issues an initialization command to the kernel. This initialization command causes initialization routines in the initialization map of kernel to execute and control the remaining part of the kernel initialization process. The initialization process begins with the operating system issuing an initialize (INIT) command to the kernel by sending an initialize command request block to the kernel. This command initiates the following sequence of events which are summarized by the flow chart in FIG. 9.

The kernel displays on the computer screen an introductory message "OAD Device Driver Initialization". This message is displayed using the DosPutMessage API call. Following the display of this message the kernel initializes the DevHlp routine pointer to the DevHlp routine address contained in the initialize command request block.

Conventionally, the operating system requires a BIOS Parameter Block (BPB) for each block device attached through a device driver. However, at this stage in the initialization process the inventive device driver does have the BPBs because the device description tables have not yet been loaded. Therefore, the kernel generates BPBs in a number equal to the maximum number of devices which can be supported by the kernel. The kernel generates BPBs by initializing an array data structure of BPBs. The contents of the BPB data structure are temporary and are replaced by device-specific contents from the device description table when it is loaded. Each loaded block device description table requires the use of a BPB to describe the device's characteristics. The temporary data contents of the BPB are replaced by device-specific information from the device description table. This is in accordance with the operating system requirements for a device driver which the kernel must satisfy to be a valid device driver. Table 4 of Section VIII sets forth a C data structure which identifies the contents of a block device BPB.

After completing the above steps, the initialization process enters the dynamic loading phase of its execution. This phase begins with an attempt to open, via the DosOpen initialization routine, the configuration file (CONFIG.OAD). If the open fails then an error message is displayed and the kernel returns an error condition to the operating environment.

The configuration file (CONFIG.OAD) is comprised of a plurality of configuration records with one record for each device or adapter description table that has been selected for loading. Once the configuration file (CONFIG.OAD) is opened, the configuration records are read from the file, via the DosRead initialization routine. The fields of the configuration record are specified by the C data structure set forth in Table 5 of Section VIII. Some of the fields are only applicable to adapter description tables, some fields are only applicable to device description tables and some fields of the configuration record are common to both device and adapter description tables. The first field, INI_rec_type is used to identify the type of description table (i.e. device or adapter) loaded and is not loaded into the global data structure. Other entries in the configuration fields are entered into the fields of the global data structure. Each configuration record field (except INI_rec_type) has a corresponding global data structure field into which the contents of the configuration record field is entered. As an example, the entry in the INI_irq_data field is entered into the ADAPTER IRQ LEVEL field of the adapter data structure in FIG. 3.

Configuration records contain the information necessary to configure the device driver for execution. The configuration record contains the name of the description table (INI_NAME) that is to be loaded and linked to the kernel.

If the configuration record is an adapter record, then the information necessary to configure the adapter is included in the configuration record. This information includes the differences between memory-mapped adapters and Port-I/O adapters.

If the configuration record is a device record then information concerning the physical connection of the device to an adapter is included in the configuration record. This information includes the type and identification of the device.

Normally there is a separate description table for each device or adapter in the system configuration. However, if the system configuration includes two or more devices of the same kind (or two or more adapters of the same kind), then a single description table can be shared by such devices (or adapters). Sharing can be based on a common NAME or on a common DEVICE TYPE as defined in the configuration record and the global data structure. The configuration record has a fixed field (INI_rec_type) that controls the type of configuration record (i.e. device or adapter) and controls the type of description table usage (i.e. shared or nonshared). This fixed field (INI_rec_type) determines which one of the following four types of usage is applicable:

1. Adapter Description Table (non-shared)
2. Device Description Table (non-shared)
3. NAMEd File (sharing of description table determined by common contents of the NAME field)
4. TYPED File (sharing of description table determined by common contents of the DEVICE TYPE field)

The most common usages are nonshared uses of device description tables and adapter description tables. However, sharing based on a common NAME or a common DEVICE TYPE can also be used.

A NAMEd file is used after a description table has already been linked to the kernel as a non-shared description table. This non-shared description table has been loaded into memory and its memory address pointers have been entered into the data structure of the device or adapter. When a subsequent configuration record is read and if the INI_rec_type field indicates a NAMEd file, a search is made by the kernel's initialization map to locate a data structure (a vertical column in the global data structure of FIG. 3) having a NAME field whose entry matches the entry in the INI_NAME field of the configuration record. When this already loaded device description table is found then the information pertaining to the address of the code and data for that previously loaded description table is copied to the appropriate device or adapter data structure of the description table being loaded (i.e. the description table having the NAMEd file). An additional copy of the description table is not loaded into memory, however, configuration information such as the ADAPTER NUMBER and other field entries are loaded from the configuration file CONFIG.OAD into the device data structure for the new device or adaptor which shares the description table. The contents of the data structure for the new device or adapter thus contains configuration information for the new device or adapter and address information for the previously loaded description table.

Typically, the use of NAMEd File sharing of a previously loaded description table allows a device to be identified using only the field in the data structure (which in this example requires less than 512 bytes) rather than loading a duplicate description table (which in this example may require more than 4,000 bytes).

In the example of FIG. 3, the device B1 description table is loaded only once. Two data structures (represented in FIG. 3 as two vertical columns) in the global data structure are used to allow two devices B1 to be used as a real device and a default device. This allows a shared description table to be used in two different ways—e.g., as a real device and as a default device supporting a logical device. This type of description table is a shared device description table. In other words, the only size penalty that is incurred by utilizing the NAMEd file is the overhead of a device data structure that is typically less than 512 bytes.

The advantages of utilizing NAMEd files in a memory constrained environment, such as MS-DOS, can be beneficial. In a more memory liberal environment it is suggested that NAMEd files not be used, but rather that the device description tables be defined as separately loaded description tables to obtain optimum device description table protection and physical memory separation.

Typed Files are analogous to NAMEd Files. However, the location of the search for the previously loaded description table is limited to the default device description table entries in the global data structure. The file matching algorithm is also different. Rather than matching the contents of the NAME fields of the global data structure, a Typed file matches the contents of the DEVICE TYPE fields. The DEVICE TYPE specified in the configuration record is matched with the DEVICE TYPE fields specified in the data structures of the currently loaded default description tables. Where the match occurs, entries are transferred from the configuration record of the configuration file CONFIG.OAD into the fields of the new data structure for the new device but a duplicate copy of the description table is not loaded. Memory addresses for the previously loaded description table are copied into the memory address fields of the new device data structure.

The way in which a Typed file is loaded is as follows. The user specifies in the configuration record that this entry is a Typed file description table. This implies that the user has also provided in the configuration record a DEVICE TYPE value in the INI type field. As the particular configuration record is being processed configuration entries are made into the device data structure for this description table.

Finally, a search is made through all of the previously loaded default devices to determine if the contents of the DEVICE TYPE fields of the configuration record and a default device description table match. If a match is found then the information pertaining to the memory location of the previously loaded default device description table is copied into the typed file's device data structure.

In summary, a Typed file is simply another method of implementing the concept of shared device description tables.

The following is a more descriptive example of the initialization and loading of description tables. This example identifies specific initialization routines (API calls) and service routines (DevHlp routines) that are used.

The configuration record as contained in the configuration file (CONFIG.0AD) contains the name (INI_NAME) of a description table file. The initialization map uses this name to locate within the library the description table file having the same name. The library contains the loadable description table files. This library also contains the available kernels and the configuration file.

A DosOpen initialization routine (API call) is issued by the initialization map to open the description table file. Once the description table file is opened, a DosRead initialization routine (API call) is issued by the initialization map to read the information contained in the header of the description table file. This information contains the length of the code and data segments both in the description table file and in the computer memory after loading has occurred.

From the information contained in the header, the following six variables are extracted. See FIG. 11.

1. Code Segment Pointer to Code in Description Table File
2. Code Segment Length in Description Table File
3. Code Segment Length in Computer Memory
4. Data Segment Pointer to Data in Description Table File
5. Data Segment Length in Description Table File
6. Data Segment Length in Computer Memory After the information from the description table header has been read by the initialization map, the actual description table file loading process begins. The description table file is loaded in two parts. First, the code segment of the description table file is loaded into computer memory. Then the data segment of the description table file is loaded into computer memory. The following paragraphs describe the operations performed in the loading process.

First, an AllocPhys service map DevHlp routine call is made by the kernel through its initialization map to allocate the amount of physical memory required to load the code segment into computer memory. The result of the AllocPhys call is a physical 32-bit address that is saved in the PHYSICAL ADDRESS CODE field of the data structure (see FIG. 3) associated with the description table being loaded.

Second, a PhysToVirt service map DevHlp routine call is made by the kernel through its initialization map to convert the physical address returned from the AllocPhys call into a usable virtual address. The result of the PhysToVirt call is a 32-bit virtual address that is stored in the VIRTUAL ADDRESS CODE field of the data structure associated with the description table being loaded.

Third, a DosChgFilePtr service map DevHlp routine call is made by the kernel through its initialization map to position the file pointer to the appropriate location in the file where the code segments begins.

Fourth, a series of DosRead initialization routine calls are made by the kernel through its initialization map to read the code segment from the description table file into the physical memory just allocated. This process of reading the code segment from the description table file continues until all of the code has been read.

Fifth, an UnPhysToVirt DevHlp service map routine call is made by the kernel through its initialization map to release the virtual address that was allocated in order to read the code from the description table file into the physical memory previously allocated.

Sixth, an AllocateGDTSel service map DevHlp routine call is made by the kernel through the initialization map to allocate a global descriptor table (GDT) selector to the description table file in computer memory. This selector is equivalent to a virtual address such as the address obtained from the PhysToVirt call previously used. However, the AllocateGDTSel call is intended to allocate a virtual address for use until the system is rebooted, whereas the PhysToVirt call is intended for short-term virtual address operations. The result of the AllocateGDTSel call is a selector/segment entry that is entered into the VIRTUAL ADDRESS CODE field of the data structure which replaces the entry for the PhysToVirt address of the second step.

Finally, a PhysToGDTSel service map DevHlp routine call is made by the kernel through its initialization map to initialize the allocated selector (VIRTUAL ADDRESS CODE) to the physical memory location (PHYSICAL ADDRESS CODE) previously allocated.

Once the code segment has been loaded into memory then the data segment is loaded. The following describes the loading process required to load the data into physical memory.

First, an AllocPhys service map DevHlp routine call is made by the kernel through its initialization map to allocate the amount of physical memory required to load the data segment into the computer memory. The result of the AllocPhys call is a physical 32-bit address that is saved in the PHYSICAL ADDRESS DATA field of the data structure of the description table being loaded.

Second, a PhysToVirt service map DevHlp routine call is made by the kernel through its initialization map to convert the physical address returned from the AllocPhys call into a usable virtual address. The result of the PhysToVirt call is a 32-bit virtual address that is stored in the VIRTUAL ADDRESS DATA field of the data structure associated with the description table being loaded.

Third, a DosChgFilePtr service map DevHlp routine call is made by the kernel through its initialization map to position the file pointer to the appropriate location in the file where the data segment begins.

Fourth, a series of DosRead initialization routine calls is made by the kernel through its initialization map to read the data segment from the description table file into the physical memory just allocated. This process of reading the data segment from the description table file continues until all of the data has been read.

Fifth, an UnPhysToVirt service map DevHlp routine call is made by the kernel through its initialization map to release the virtual address that was allocated in order to read the data from the file into the physical memory previously allocated.

Sixth, an AllocateGDTSel service map DevHlp routine call is made by the kernel through its initialization map to allocate a global descriptor table (GDT) selector to the description table file in computer memory. This selector is equivalent to a virtual address such as the address obtained from the PhysToVirt call previously used. However, the AllocateGDTSel call is intended to allocate a virtual address for use until the system is rebooted, whereas the PhysToVirt call is intended for short-term virtual address operations. The result of the AllocateGDTSel call is a selector/segment entry that is entered into the VIRTUAL ADDRESS DATA field of the data structure for the PhysToVirt address of the second step.

Finally, a PhysToGDTSel service map DevHlp routine call is made by the kernel through its initialization map to initialize the allocated selector (VIRTUAL ADDRESS DATA) to the physical memory location (PHYSICAL ADDRESS DATA) previously allocated.

If at anytime the loading process fails then all allocated memory and selectors are returned to the system. Once the resources are returned to the system then an appropriate error message is issued by the kernel through its initialization map and the initialization terminates.

H. Protected Mode of Operation

A description table can operate in protected mode when the processor and operating system support protected mode. If protected mode is not supported (e.g. MS-DOS) then the kernel simulates protected mode as much as possible. Protected mode ensures that each description table is independent of other description tables and cannot interfere with other portions of the operating system or other programs or data. Protected mode uses virtual addresses which in general do not have a constant mapping to a physical memory address. In a protected mode system, application programs operate only using virtual addresses. Device drivers and other hardware oriented programs require a knowledge of the corresponding physical address associated with the virtual address. Address pointers to loaded description tables in the global data structure require access to both virtual and physical addresses.

In order to ensure the integrity of the description table, both the data and code segments of the description table operate at level 3, protected mode, of the operating system. The kernel operates at level 0, an unprotected mode. The data segment is restricted to a read/write mode while the code segment is restricted to a read/write/execute mode. Any description table or other program in the system that attempts to use these memory segments in a mode other than defined will create a memory violation error. In addition, the protected mode of the computer assigns specific memory segments to the code and data segments. Any attempt from the software operating in the description table to access data outside of the boundaries of the defined memory segment will also create a system error condition. The protection of memory allocation and the authorization level insure that each description table operates independently of other description tables and applications in the system.

The OS/2 and Unix operating systems use protected mode and allow virtual addressing. MS-DOS does not use protected mode or allow virtual addressing. Therefore, the MS-DOS kernel emulates virtual addresses by equating virtual addresses to physical addresses. For OS/2, Unix and other operating systems that use protected mode, virtual addresses for each section of memory are contained in selectors which are part of the global description table (GDT) of the operating system. A selector must be set up for the physical and virtual addresses and modes of access for the description table to operate correctly with the kernel. These operating systems do not allow for the setting of GDT selector mode entries to Read/Write/Execute mode as required by the code segment of the description table. For each description table there are two GDT selectors (see FIG. 10). One selector for code segment and one selector for data segment. Each selector is assigned a mode of access by the operating system. A mode of access means Read/Write/Execute mode, Read/Write mode, Read mode, etc. The code segment requires a Read/Write/Execute mode but the operating system does not permit this during initialization. Therefore, during initialization the access mode is set to a permitted mode (e.g. Read/Write). To provide for the setting of the selector entries in the global description table to Read/Write/Execute as required, a flag is set when the first record of the configuration file (CONFIG.OAD) is read. After setting this flag, the kernel continues to read consecutive records from the configuration file (CONFIG.OAD), attaching description tables and setting the selector mode to Read/Write. This process continues until the last record is read. The kernel returns control to the operating system and kernel initialization is complete. When the first operating system request is received by the kernel, the flag is interrogated. If the flag is set, the kernel will loop through the selectors and change the selector mode for each description table code segment to Read/Write/Execute. The flag is set to a state indicating that selector mode change is no longer needed. This process allows each of the description tables to operate in protected mode if the operating system allows protected mode operation.

This process of setting up the selectors in the global description table allows each of the description tables to operate in protected mode. Protected mode ensures that the description table will not interfere with other programs or data in computer memory (e.g. RAM). The kernel, being a device driver, must operate in an unprotected mode and as such has access to all sections of computer memory. This linkage of an unprotected mode kernel to protected mode adapter and device description tables is accomplished by the kernel setting the selectors for each description table to the proper Read/Write/Execute mode after initialization and by setting up the required memory addresses (both physical and virtual addresses) in the global description table and in the global data structure. As a result, the operating system and the computer monitor the operation of each description table. If the routines in the adapter or device description tables try to access memory in a mode other than Read/Write/Execute for code or Read/Write for data or tries to access a section of memory that is not allocated to the description table, the operating system detects a memory access violation error and stops the system. This process helps ensure the independence of the adapter and device description tables and allows them to be combined in different combinations and to operate in a reliable manner. If a programming error exists in a description table, the operating system will not allow this error to cause undetected errors in other description tables or other programs or data. Instead the system will stop and the error can be fixed to ensure reliable operation.

MS-DOS does not support a protected mode of operation. In this case, the memory management functions required by the adapter and device description tables are simulated through the environmental map of the MS-DOS kernel. Isolation of description tables is maintained (to the extent possible) even in the MS-DOS kernel by using independent computer register values for each or description table. In this case a register set is stored in computer memory for each description table and is used only by that table. Thus problems which can occur from sharing register sets are minimized.

Figure 10:
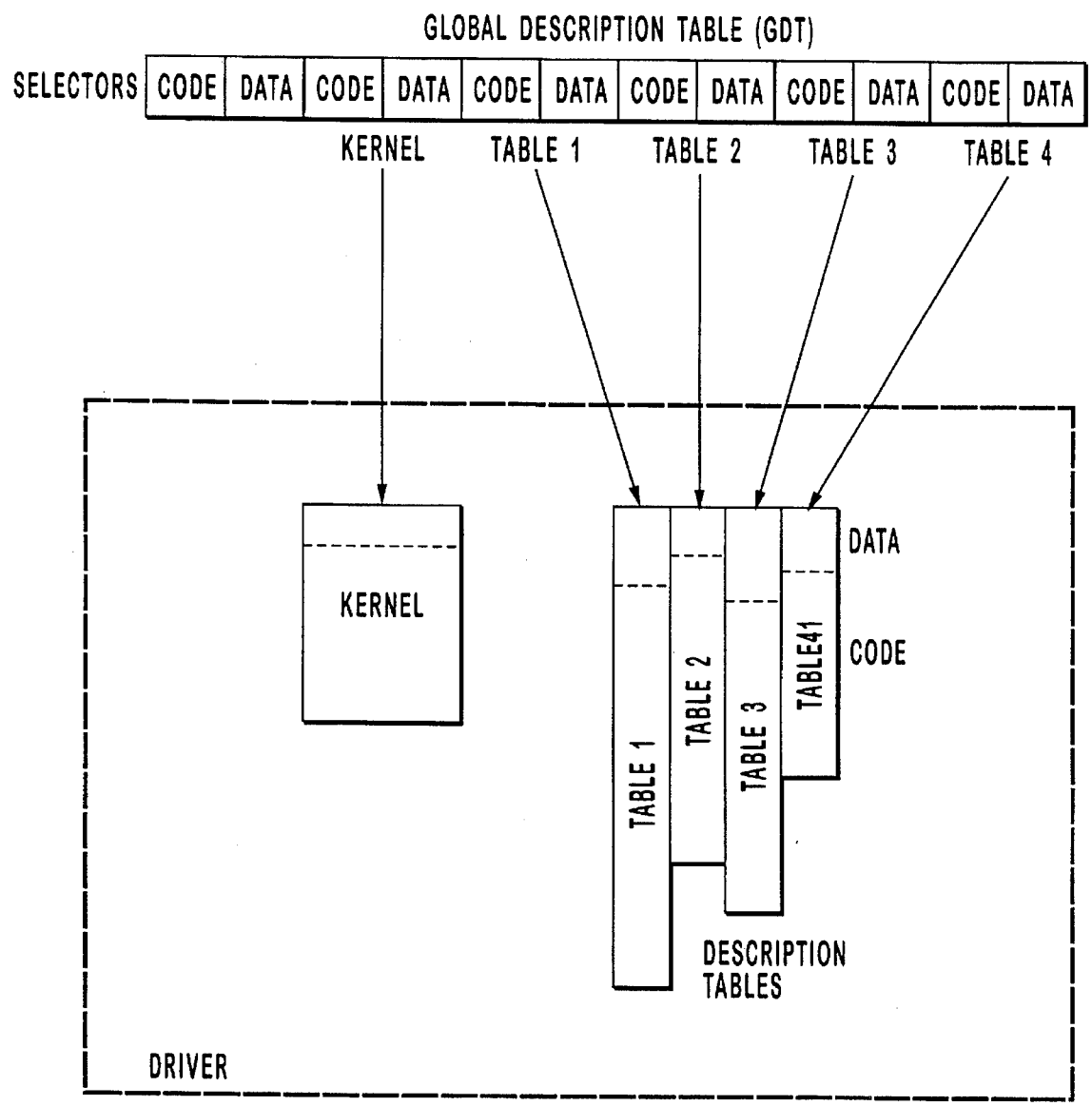
FIG. 10 depicts global description table selectors, a kernel and description tables.

At the completion of the initialization and loading process, system memory is set up as shown in FIG. 10. The file loader is used to read configuration records from the configuration file (CONFIG.OAD) if the operating system does not provide this support. If the operating system does not provide this support (i.e. if the kernel cannot access the operating system's file loader), then a file loader must be provided as part of the kernel's initialization map. An accessible file loader is provided in the OS/2 operating system. However, a file loader must be provided as part of the initialization map of an MS-DOS kernel. At the completion of initialization, linked to the kernel and included as part of the assembled device driver are the device and adapter description tables. The operating system global description table (GDT) is set up with the description table code segments set for Read/Write/Execute with references to each of the code and data segments of the description tables. Data segments are set up in a Read/Write mode.

I. Service Map and Pointers

The kernel, device description tables and adapter description tables require access to operating system functions such as memory management, physical to virtual memory address mappings, etc. Some operating systems, such as OS/2 , provide direct access to these functions. Others, such as MS-DOS, do not use or provide access to these functions. The service map of the invention provides a means whereby the kernel and description tables can have access to a common set of service routines (i.e. the service map provides service routines to the kernel and description tables). In this example or embodiment of the invention, the service routines of the service map are referred to as DevHlp routines (because certain OS/2 DevHlp routines were selected as a model set of service routines). Each kernel in library 10 uses the same set of service routines or DevHlp routines in the service map of each kernel. DevHlp routines are numerically indexed. The kernel and the description tables call or reference DevHlp routines through this index.

Figure 8:
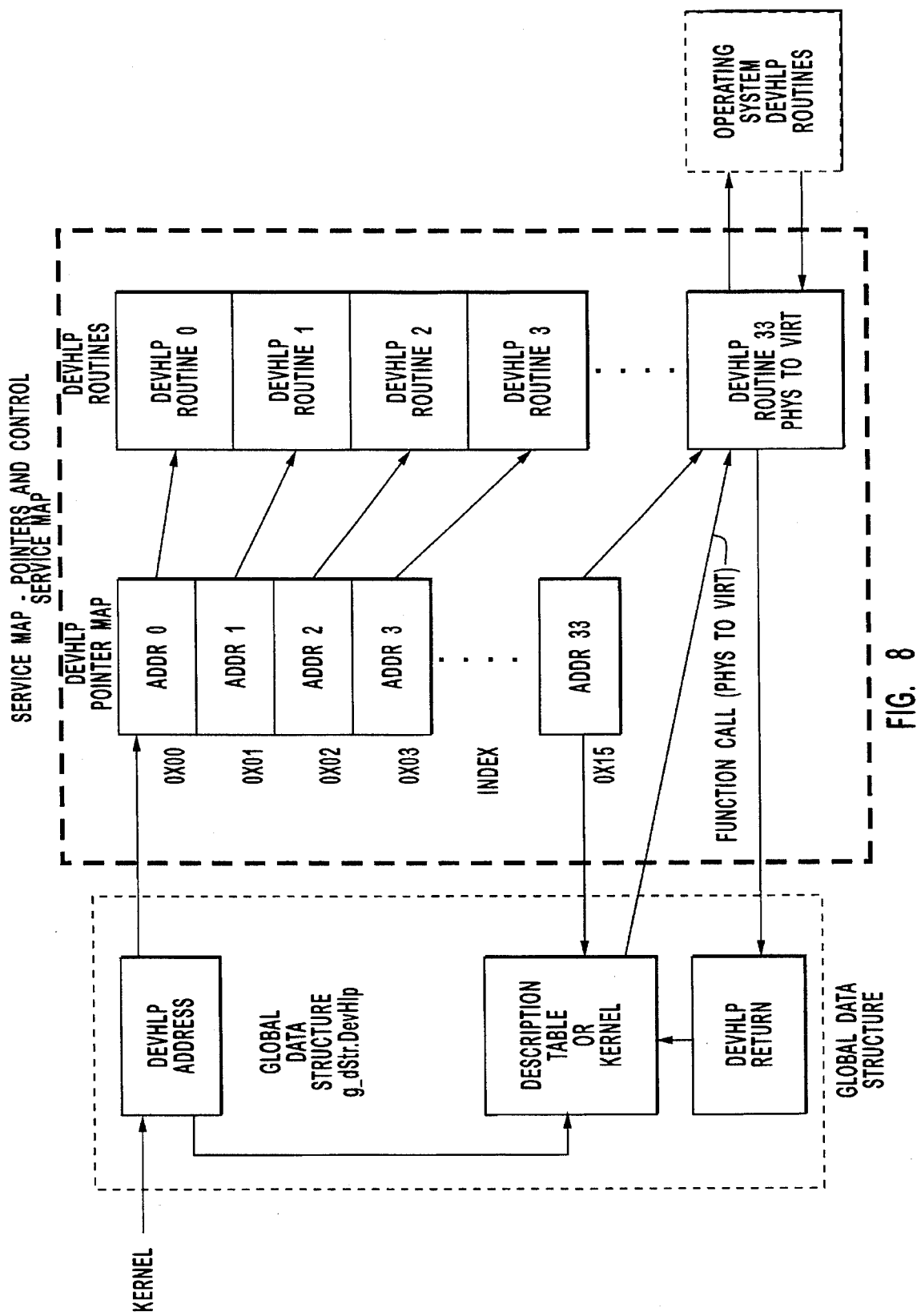
FIG. 8 depicts a service map.

An example operation of the service map is shown in FIG. 8. The service map contains a service pointer map referred to as a DevHlp pointer map. The service map map also contains service routines, e.g., DevH1p routines. The address of each of these DevHlp routines is contained in its associated entry in the DevH1p pointer map. Thus, DevH1p pointer map position 0, has the address of DevH1p routine 0. DevH1p pointer map position 1 has the address of DevH1p routine 1, and so on.

The DOS and Unix kernel service maps implement the desired DevHlp routine directly (i.e. these service routines are part of the kernel's service map). Since OS/2 provides a device driver access to OS/2's DevHlp routines, the DevHlp routines are contained in the OS/2 operating system (i.e. the OS/2 kernel's service map does not contain the DevHlp routines but does contain a means for calling or accessing the DevHlp routines in the OS/2 operating system).

The service map is accessed by the kernel and the description tables using the DEVHLP ADDRESS field of the global data structure. This DEVHLP ADDRESS field contains the address of the DevHlp pointer map (a service routine pointer map) which is contained in the kernel service map. As an example, when a description table needs DevHlp routine 1, the description table uses the address of the DevHlp pointer map contained in the DEVHLP ADDRESS field of the description table's data structure as a base address. To this base address, an index offset of 1 is added which points to the address of entry 1 in the DevHlp pointer map. Entry 1 is the address of DevHlp routine 1. The description table uses the contents of entry 1 to call DevHlp routine 1. The called DevHlp routine is executed and provides the function required by the description table.

When the DevHlp routine has completed its function, it returns control to the description table. The service map DevHlp routines are the same for the MS-DOS kernel, OS/2 kernel and Unix kernel (and any other kernels for other operating systems) in library 10. The implementations are different, however. The MS-DOS and Unix kernel service maps include the DevHlp routines. The OS/2 kernel service map uses the DevHlp routines which are contained in the OS/2 operating system. The address to the DevHlp pointer map is contained in the DEVHLP ADDRESS field of the global data structure. The DevHlp pointer map has the addresses to the DevHlp routines. Thus, the description table has a means of addressing (and, therefore, accessing or calling) a service map which provides service routines (DevHlp routines) which are common to all of the kernels in library 10.

Some operating systems may implement directly only a portion of the DevHlp routines needed by the description tables or the kernel. The kernel service map for these operating systems will then activate the DevHlp routine, e.g., DevHlp 33 as shown in FIG. 8, in a manner similar to the service map for OS/2 . In this example, DevHlp routine 33 calls the DevHlp function contained in the operating system. Other DevHlp routines, (Routines 0, 1, 2, 3 in the example of FIG. 8) are implemented directly in the service map in a manner similar to the service maps of MS-DOS and Unix.

The inventive device driver does not necessarily utilize all of the OS/2 DevHlp routines, The following list indicates the DevHlp routines that are employed within the kernel as service map routines in this embodiment of the invention. These are a subset of the OS/2 DevHlp routines.

AllocateGDTSel

AllocPhys

FreePhys

PhysToGDTSel

PhysToVirt

Run
SetIRQ
UnPhysToVirt

J. Operation of the Invention

Figure 6:
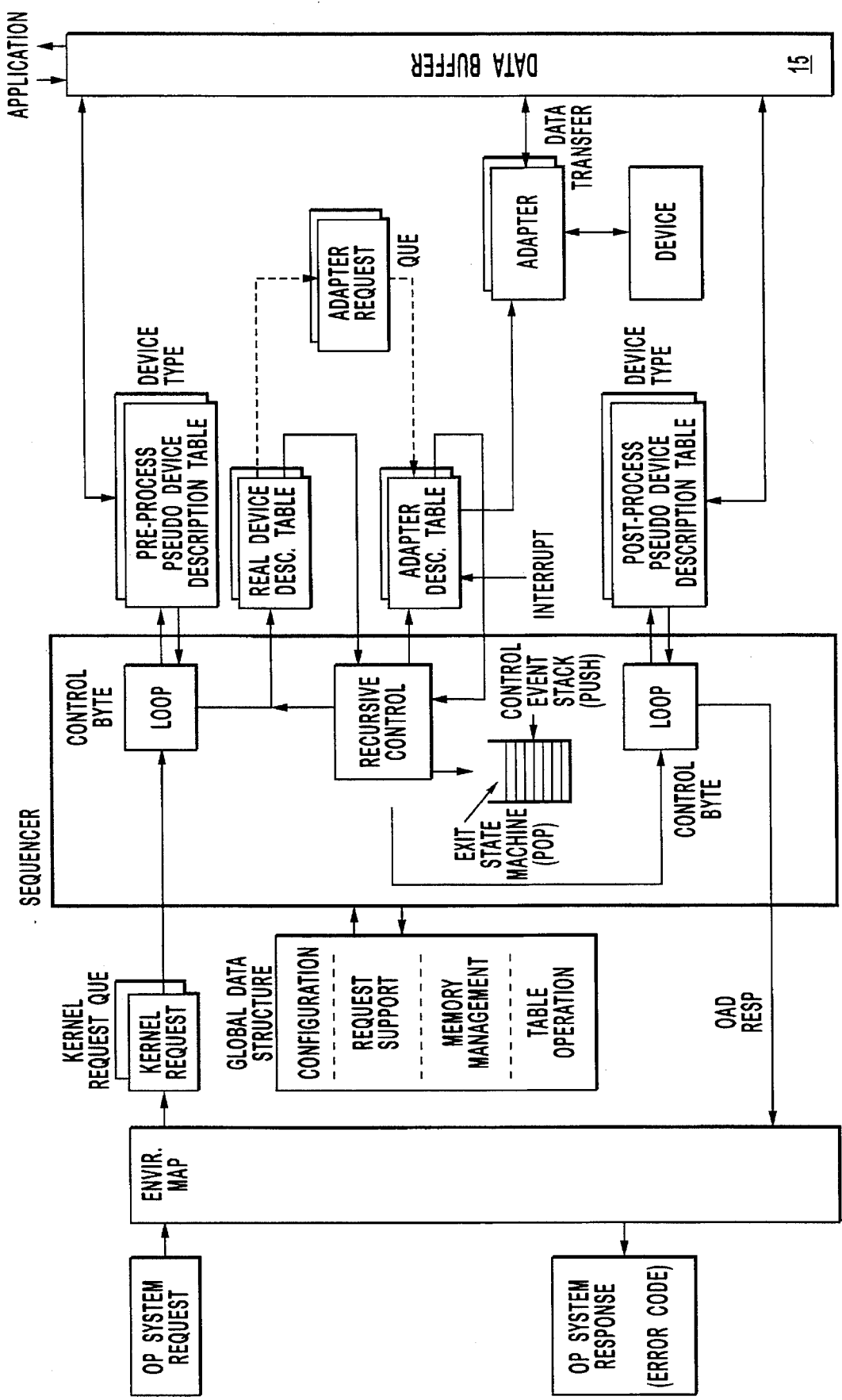
FIG. 6 depicts the processing of an operating system request and includes the environmental map, sequencer, device description tables and adapter description tables.

The invention provides support for devices and adapters, This support is partitioned into the following functional areas as shown in FIG. 6:

1. Pre-processing functions (pre-process pseudo device description tables)

2. Device specific translation (device description tables, including real, logical and default device description tables but not including pseudo device description tables)

3. Adapter specific translation (adapter description tables)

4. Post-processing functions (post-process pseudo device description tables.)

Figure 12:
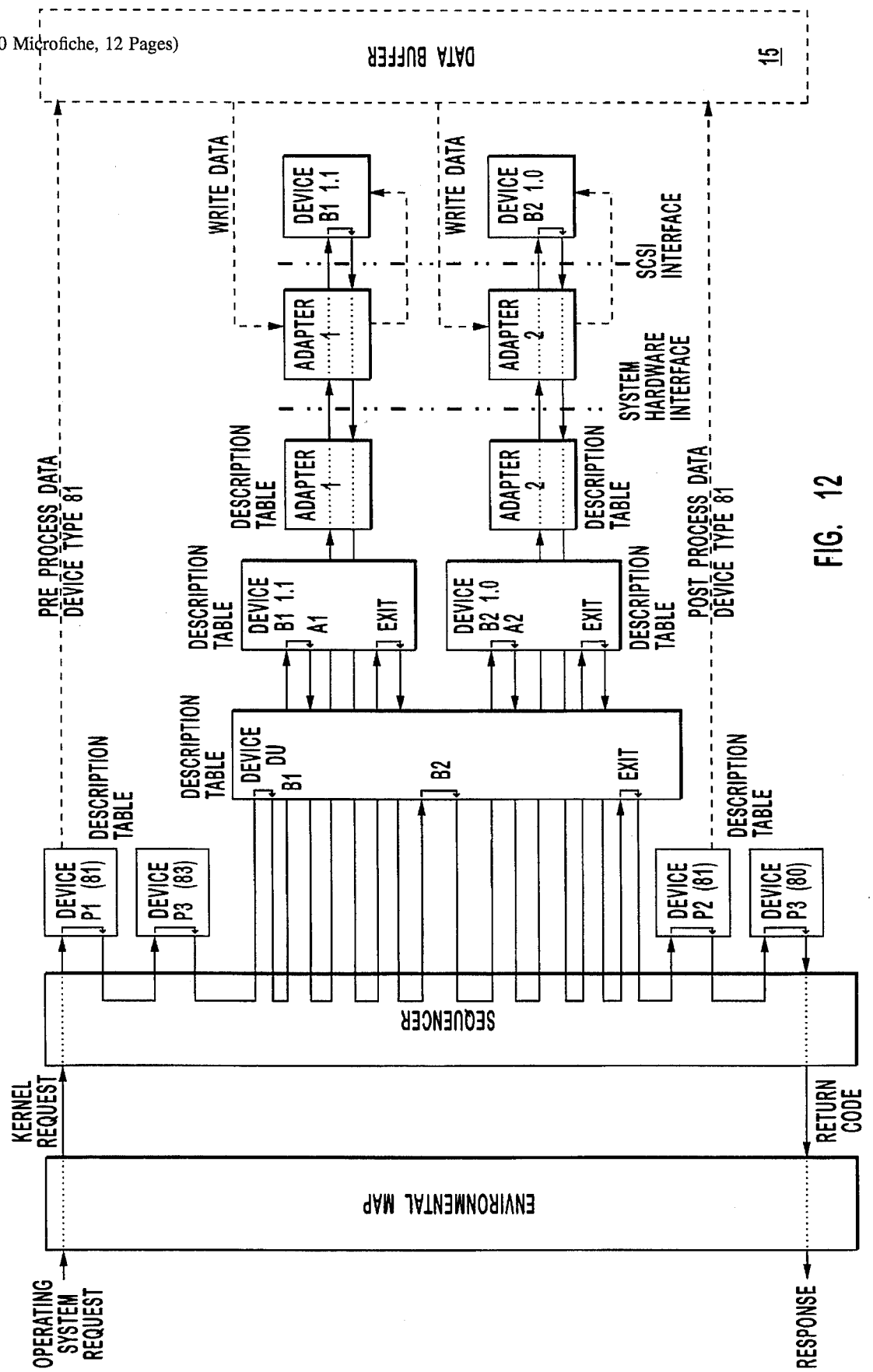
FIG. 12 depicts the processing of an operating system request.

FIG. 12 shows an overview description of relationships between the different types of device description cables and adapter description tables. Each description table is implemented using a state machine model. The description tables operate in a sequence defined by the contents of the global data structure as controlled by a sequencer. The sequencer is a means for sequencing the operation of the description tables. The sequencer is a computer program and is part of the kernel.

The operation of the inventive device driver begins with the operating system creating a request as shown in FIG. 12. This operating system request is translated to a common kernel request by the environmental map. This translation can be any means for creating the appropriate kernel request in response to the operating system request. Some operating system requests may be translated into more than one kernel request. The sequencer, upon receiving the kernel request, loops through the pseudo device description tables identified as pre-processors in the CONTROL BYTE field of the global data structure. The sequencer activates, in an ordered sequence, each pseudo device description table which has been specified as a pre-processing pseudo device description table in its CONTROL BYTE field (see global data structure in FIG. 3). The ordered sequence is the order of psuedo devices defined in the global data structure (see FIG. 3). The order in which pseudo device description tables are linked is determined by the order in which the pseudo device description tables are linked to the kernel. This order is determined or defined by the configuration file. The operations shown in FIG. 12 represent the configuration of FIG. 2 for the processing of Logical Device DU (device 45). The kernel request is received by the sequencer in the form of a request block. The address of the request block is placed by the sequencer into the REQUEST POINTER field of the data structure of Logical Device DU. Thus, the Logical Device DU description table has access to the complete request block and all information contained within the block. As shown in FIG. 3, the data structure associated with Logical Device DU has a DEVICE TYPE defined as 81. The sequencer places into the UNIT QUEUE POINTER field of the pseudo device's data structure a pointer to Logical Device DU's data structure. Using its UNIT QUEUE POINTER, the Pseudo Device P1 description table interrogates the DEVICE TYPE field of Logical Device DU, finds the field equal to 81 and proceeds to pre-process the data in the data buffer (which can be, for example, data in the application's buffer space or in any other buffer space). The DEVICE TYPEs for which the pseudo device description table will process (e.g. 80, 81, etc.) are programmed into the pseudo device description table. The Pseudo Device P1 description table is programmed to process device type 81. Upon completion of this processing, the Pseudo Device P1 description table, creates an Exit State Machine control event and passes control back to the sequencer. This control event is an action routine function. The sequencer loops to the next pseudo device description table that is set for pre-processing in its CONTROL BYTE. Note that Pseudo Device P2 is by-passed because its CONTROL BYTE is not set for pre-processing (it is set for post-processing only). Pseudo Device P3 is the next pseudo device set for pre-processing. However, the Pseudo Device P3 description table is programmed to process DEVICE TYPE 80. This DEVICE TYPE does not match the 81 set for Logical Device DU. Therefore, the Pseudo Device P3 description table does not process the data in the data buffer. The Pseudo Device P3 description table creates an Exit State Machine control event and passes control back to the sequencer.

The sequencer next accesses the Logical Device DU description table because Logical Device DU is the target of the operating system request and kernel request. Control is passed to the Logical Device DU description table. It is programmed to create an Invoke Default Device control event which causes control to be passed back to the sequencer. This control event is an action routine function. Logical Device DU has invoked a default device description table. Note, that in this example, the logical device description table invokes the default device description table through the sequencer. It is possible for a logical device description table to invoke the default device description table in other ways, for example by a direct call to the default device description table.

The sequencer interrogates the contents of the DEFAULT BASE field of the data structure associated with Logical Device DU. This field contains a 0 which indicates control is to be passed to the 0'th (first) default device. This default device is Device B1. The sequencer passes control to the Device B1 description table. The Device B1 description table creates an adapter request (including a device command for Default Device B2) and creates an Execute Adapter control event and passes control back to the sequencer. The sequencer interrogates the ADAPTER NUMBER field of the data structure associated with Default Device B1 and finds Adapter 1 is attached to Default Device B1. The sequencer passes control to the Adapter 1 description table.

The Adapter 1 description table then issues the device command by addressing registers in the adapter itself through the system hardware interface. These registers in turn transfer information and control via the SCSI interface (or other device interface) to the registers of Device B1. After setting up Default Device B1 for a data transfer, the Adapter 1 description table places Default Device B1 into a data transfer phase. In this example, a duplex write is to take place. Therefore, data is written from the data buffer into Default Device B1.

Upon completion of the writing of data from the data buffer to Default Device B1, control is passed back to the Adapter 1 description table from Adapter 1. The Adapter 1 description table creates an Exit State Machine control event and passes control back to the sequencer. The sequencer, detecting the Exit State Machine control event from the Adapter 1 description table, passes control back to the Default Device B1 description table. Default Device B1 description table creates an Exit State Machine control event and passes control back to the sequencer. The sequencer detecting the Exit State Machine control event passes control back to Logical Device DU. Logical Device DU, then creates an Invoke Default Device control event and passes control back to the sequencer. The sequencer keeps track of the number of passes through the default devices. Since this is the second pass, the sequencer adds one to the DEFAULT BASE field in the device data structure associated with Logical Device DU. The sequencer then passes control to the next default device description table in accordance with the ordered sequence in the global data structure and the DEFAULT BASE field of Logical Device DU. The next default device description table is the Default Device B2 description table. This activates the Default Device B2 description table.

The sequencer passes control to the Default Device B2 description table. The Default Device B2 description table creates an adapter request (including a device command for Default Device B2) and creates an Execute Adapter control event and passes control back to the sequencer. The sequencer interrogates the ADAPTER NUMBER field of the data structure associated with Default Device B2 and finds Adapter 2 is attached to Default Device B2. The sequencer passes control to the Adapter 2 description table.

The Adapter 2 description table then issues the device command by addressing registers in the adapter itself through the system hardware interface. These registers in turn transfer information and control via the SCSI interface (or other device interface) to the registers of Default Device B2. After setting up Default Device B2 for a data transfer, the Adapter 2 description table places Default Device B2 into a data transfer phase. In this example, a second duplex write is to take place. Therefore, the same data is written from the data buffer into Default Device B2 as was previously written into Default Device B1.

Upon completion of the writing of data from the data buffer to Default Device B2, control is passed back to the Adapter 2 description table from Adapter 2.

The Adapter 2 description table creates an Exit State Machine control event and control is passed to the sequencer. The sequencer returns control to the Default Device B2 description table. The Default Device B2 description table also creates an Exit State Machine control event which returns control to the sequencer. The sequencer returns control to the Logical Device DU description table. The Logical Device description table also creates an Exit State Machine control event which returns control to the sequencer.

The sequencer then activates, in an ordered sequence, each pseudo device description table that is set for post-processing in its CONTROL BYTE field. Control is passed by the sequencer to the Pseudo Device P2 description table which is the first post-processing description table in the ordered sequence. The Pseudo Device P2 description table interrogates the value of the DEVICE TYPE field of the data structure of Logical Device DU and the device type value programmed into the Pseudo Device P2 description table. Each of these values is 81. Post-processing by the Pseudo Device P2 description table of data in the data buffer then takes place. Upon completion of processing of data in the data buffer, the Pseudo Device P2 description table creates an Exit State Machine control event and passes control back to the sequencer. The sequencer then passes control to the Pseudo Device P3 description table which finds that the value (81) of the DEVICE TYPE field associated with Logical Device DU does not match the device type value (80) programmed into the Pseudo Device P3 description table. Therefore, the Pseudo Device P3 description table does not post-process data in the data buffer. The Pseudo Device P3 description table creates an Exit State Machine control event and passes control back to the sequencer.

Since Pseudo Device P3 is the last pseudo device with entries found in the global data structure, the sequencer, using the contents of Logical Device DU's ERROR field, creates an error (return) response to the environmental map. This error response is translated by the environmental map into the required Operating System error response. Normally a "0" error response indicates a successful completion. This completes the device driver's response to the operating system request.

A more detailed description of the operation of the inventive device driver is shown in FIG. 6. The operating system creates an operating system request. A list of OS/2 operating system requests is shown in Table 6 of Section VIII. Table 8 of Section VIII is a list of MS-DOS operating system requests. Other operating systems have their own lists of operating system requests. These operating system requests are translated using the environmental map of the kernel into kernel requests which are presented to the sequencer. The sequencer activates and sequences the description tables. The sequencer provides overall coordination between the functions of pre-processing, device description table processing, adapter description table processing and post-processing. A list of the kernel requests is set forth in Table 7. Kernel requests are referenced numerically to support a common interface to loadable description tables. Thus, the kernel requests are referenced and called by number (i.e., each kernel request has a unique kernel request number assigned to it). The environmental map converts or maps an operating system request into one (or sometimes more than one) numerically referenced kernel request.

The operating system request and the kernel request each identify a block device unit number or a character device name which identifies the requested or targeted device and which is used by the sequencer to identify the device data structure of that device. The sequencer uses the entry in the CONTROL BYTE field of each pseudo device description table to determine if pre-processing is required. If pre-processing is required, the sequencer loops through each of the pre-processing pseudo device description tables by activating the cell processor for each in turn.

Data is stored in a data buffer before it is written to or read from a peripheral device. The pseudo device description table provides processing to translate this data before it is written to or read from a device. This processing is performed in a manner which is transparent to the operating system. The operating system is unaware of the existence of a pseudo device. For example, a pseudo device can encrypt and compress data before it is written to a peripheral device. A pseudo device performing this function is a pre-processing pseudo device. A pseudo device can be used to post-process data and decrypt or expand the data as it is read from a device. A pseudo device performing this function is a post-processing pseudo device. Also, a pseudo device can cache data before it is written or after it is read for a plurality of devices. In this case, the cache pseudo device can serve as both a pre- and a post-processing pseudo device.

Each pseudo device description table is activated in turn by the sequencer looping through the pseudo device description tables in an ordered sequence for those pseudo device description tables having their CONTROL BYTE set for pre-processing. This sequence is the ordered sequence in which the pseudo devices are found in the global data structure as shown in FIG. 3. Pre-processing for block devices is separate from, and precedes, pre-processing for character devices. As each pseudo device description table is activated, the pseudo device description table checks the DEVICE TYPE field associated with the character or block device which has been requested by the kernel request. If the contents of the DEVICE TYPE field match the device type value programmed into the pseudo device description table, the pseudo device description table proceeds to translate or process the data contained in the data buffer. If a match does not occur, the pseudo device creates an Exit State Machine control event and returns control back to the sequencer. The sequencer continues the loop through each of the pre-processing pseudo device description tables.

The above-described procedure is repeated in a similar manner for post-processing pseudo device description tables after data has been read from or written to a device (or devices), e.g., after logical and real device description tables and adapter description tables have been activated.

Figure 7:
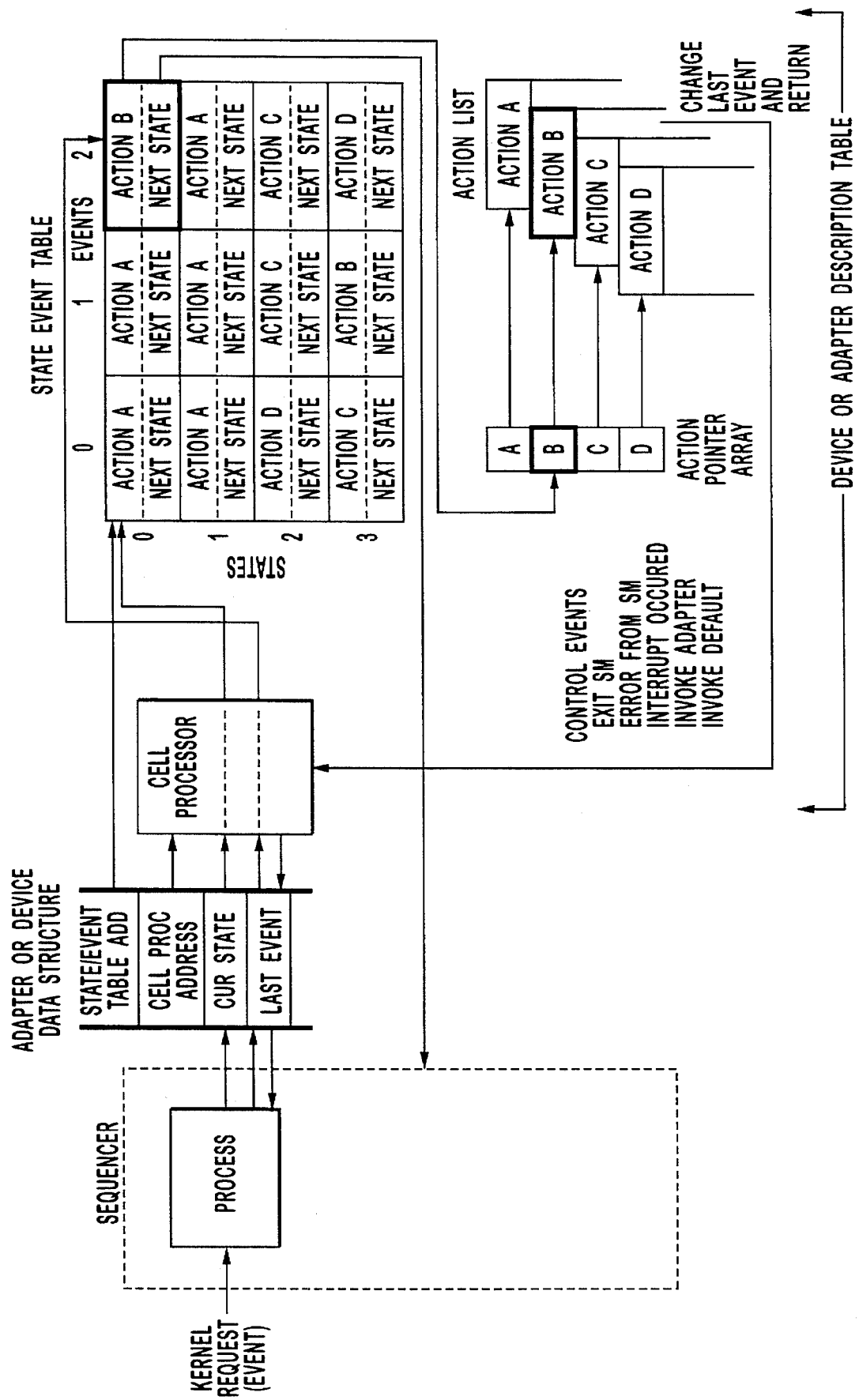
FIG. 7 depicts the cell processor, state event table and action list of a description table.

Activation of pseudo device description tables occurs as follows:

1. Pre-processing for block devices
2. Pre-processing for character devices
3. Post-processing for block devices
4. Post-processing for character devices The cell processor is shown in FIG. 7 and is part of the code segment of the description table shown in FIG. 10. A cell processor is activated by the sequencer, i.e. the sequencer calls the description table's cell processor for execution. When the cell processor is to be executed, the CELL PROCESSOR ADDRESS field of the adapter or device data structure associated with the description table is accessed by the sequencer to determine the address to the cell processor in the description table. The cell processor is called by the sequencer and gains control to continue processing of the kernel request. The cell processor obtains from the STATE EVENT TABLE ADDRESS field of the device or adapter data structure the address (which may be in the form of an offset) of the state event table of the description table. The cell processor accesses the state event table to determine which action routine is to be activated from the action list.

The state event table is shown in FIG. 7. The state event table consists of rows and columns of cells. Each cell contains two entries, the desired action to be selected from the action list and the next state. Each row of the state event table is assigned a state number. Each column is assigned an event number. Event numbers correspond to kernel request numbers, thus there is a column for each kernel request.

When accessing a device or adapter description table for the first time, the sequencer sets up an INIT (initial) state (i.e. zero) in the CURRENT STATE field of the device or adapter data structure. In addition, the sequencer sets up pointers to the device or adapter data structure and passes these pointers to the cell processor when the cell processor is called. These pointers give to the independently written description tables the addresses of all data contained in the data structure which are necessary for the description table to interface with the kernel and to function. The sequencer coordinates this data with other description tables. Direct linkage between description tables does not exist because each description table is an independent module. Description tables are linked to each other through the kernel.

The cell processor, using the contents of the CURRENT STATE and LAST EVENT fields of data structure associated with the description table, accesses the state event table cell which is the intersection of the state row and event column in the state event table. This cell contains an action reference to a routine in the action list. This action reference is an index to an entry in the action pointer array. The action pointer array points to an action routine in the action list. The action routine is executed by the digital computer to cause an action routine function. For a device description table, the desired action routine function can be the creation of an adapter request, a call to another device description table, a call to itself (i.e. the same device description table), a transformation of the kernel request, etc. For an adapter description table, the desired action routine function can set up adapter registers, can cause data to be transferred by the adapter from the data buffer to the referenced device, etc.

FIG. 7 illustrates an example. When the sequencer first activates a description table, the sequencer initializes the CURRENT STATE field to an initial state equal to 0. For the example in FIG. 7 the kernel request number is 2. Therefore, the sequencer sets state 0 into the CURRENT STATE field and a 2 in the LAST EVENT field of the data structure. The cell processor is called by the sequencer. The cell processor uses the contents of the CURRENT STATE and LAST EVENT fields to index into the state event table. It finds that the cell (at row 0, column 2) contains an action reference to Action B. The cell processor uses the Action B reference as an index into the action pointer array. Using the address in the B entry of the action pointer array, the cell processor calls Action B. Action B is then activated (i.e. executed) and performs its function. An example of a typical action routine is a routine that creates an adapter request having a device command (e.g. CDB) and an adapter description table command. Another example is a routine that sets up registers on an adapter. When an action is completed, the LAST EVENT field normally remains unchanged but in some cases may be changed. For example, when Action B is completed, the LAST EVENT field remains equal to 2. Control is passed from the action routine back to the cell processor which returns control back to the sequencer. The sequencer interrogates the LAST EVENT field of the data structure. Since the LAST EVENT field contains a 2, the sequencer interrogates the state event table cell which is at the intersection of the CURRENT STATE (row) and the LAST EVENT (column) (i.e., the cell at row 0 and column 2). The sequencer extracts the Next State from this state event table cell and places it in the CURRENT STATE field of the data structure. With the CURRENT STATE and LAST EVENT fields set up in the data structure, the sequencer then calls the cell processor. The cell processor repeats the action of selecting an action reference from the state event table cell and continues the process. This process of coordination between the sequencer and the cell processor continues until the action routine called creates a control event by placing the control event number into the LAST EVENT field. Table 9 of Section VIII is a list of control events and their assigned numbers. Control events are caused by action routines and are action routine functions. Control events can instruct the sequencer to exit the description table because it has completed processing, or invoke additional description tables for the processing of default device description tables or an adapter description table.

The state machine sequence described above is applicable to the description tables in this embodiment of the invention. Description tables can be invoked by the sequencer using linkages supplied by the memory management and table operation sections of the device or adapter data structure which is contained in the global data structure. Tradeoffs can be made in state event table complexity and the contents of the action list routines. Where complex action list routines are desired, the state event table can have few entries. For example, it may have only a single state. The state event table will have an event for each kernel request number. Conversely, where many simple short action list routines are required, the state event table may have a larger number of states defined. As a result, considerable flexibility is available to allow a description table to meet almost any level of function and complexity.

As shown in FIG. 6, pre-process functions are performed by pseudo device description tables. A plurality of pseudo device description tables can be invoked as the sequencer loops through the complete set of pseudo device description tables. Pre-processing is identified in the CONTROL BYTE for the pseudo device description table. The DEVICE TYPE field in the data structure of the requested device (i.e., the unit number device or character name device requested by the operating system) is interrogated by the pseudo device description table to determine if a match occurs. If a match occurs, then pre-processing of the data is performed by the pseudo device description table. A match occurs if the value in the DEVICE TYPE Field of the requested device matches a value programmed into the pseudo device description table. In general, pseudo device description tables operate on user data contained in the data buffer.

When each pseudo device description table has completed its function, it creates an Exit State Machine control event in the LAST EVENT field of the pseudo device data structure. When the sequencer detects this control event and all of the pre-processing pseudo device description tables (for block devices or character devices, whichever is applicable) have been looped through in sequence, the sequencer will process the device description table for the device referenced in the kernel request (i.e., the requested device). This description table processing continues using the cell processor associated with the description table of the requested device. Control is passed to the cell processor, based upon the address generated from entries in the memory management portions of the data structure associated with the description table. This device processing continues in the same manner, activating the cell processor which interrogates (i.e. accesses) the appropriate cell in the device state event table which points to the required action from the device's action list. An action routine is activated and the Next Event entry for the device is entered into the data structure for the requested device. Device description table processing creates an action routine function such as: (a) create a LAST EVENT request which causes a loop back into the same requested device description table, (b) create a request for an adapter description table to be activated or (c) request that a different device description table be activated. When a different device description table is to be activated, the device description table can also create an adapter request. When an additional device description table is to be activated, this process can be performed by a logical device description table which activates one or more default device description tables. In this embodiment of the invention the logical device description table activates (invokes) each of its default device description tables through the sequencer. In other embodiments of this invention the logical device description tables can activate or otherwise invoke its default device description tables by direct calls to the sequencer or by other means.

When creating a request to an adapter description table, the device description table first creates an adapter request which is passed to the adapter request queue. After this is completed, the device description table creates an Invoke Adapter control event and places this request into the LAST EVENT field of the device data structure. The sequencer pushes a record onto the stack in preparation for a return to the cell processor from the sequencer when an Exit State Machine control event is issued by the description table. This record contains the return address, resister contents and information required to allow the CPU to return control back to the cell processor.

A device cell processor can also create a recursive call through the sequencer. A logical device description table calls a default device description table by setting up a Start Default Device control event in the LAST EVENT field of the logical device data structure. When the sequencer processes this control event in the LAST EVENT field, it changes the value in the CURRENT STATE field in the logical device data structure to the value in the Next State taken from the state event table cell of the logical device description table. The sequencer then pushes a record onto the stack in preparation for a return to the cell processor after the processing of the default device description table. The sequencer then interrogates the DEFAULT NUMBER and DEFAULT BASE fields of the logical device data structure. From this information, the sequencer activates the required default device description table. Control is passed to the default device description table's cell processor. The processing continues as described above. Since default devices support physical devices, the default device description table will normally create adapter request and place it on the queue for processing by an adapter description table. The default device description table will create an Invoke Adapter control event, place it in the LAST EVENT field of the default device data structure and return control to the sequencer.

An adapter description table is activated (e.g., called and executed) when one or more adapter requests are on the adapter request queue and the sequencer has received an Invoke Adapter control event from a device description table or the adapter description table is called directly by the device description table. The sequencer interrogates the ADAPTER NUMBER field of the device data structure and invokes the cell processor of the adapter description table referenced by such ADAPTER NUMBER.

The adapter description table operates in a manner similar to device description tables. Action routines from the adapter description table's action list issue commands to the attached adapter and/or to the device. System configuration information for the adapter, such as ADAPTER IRQ LEVEL, PORT ADDRESS, etc., is available to the adapter description table from the adapter data structure. The adapter reads or writes data between the device and the data buffer.

Processing of the adapter description table can be interrupt driven, going to a wait state when required by the adapter description table as it is waiting for a response from the physical device. When an interrupt is received from the operating system by the kernel, the kernel branches to the address contained in the INTERRUPT SERVICE ROUTINE ADDRESS field of the adapter data structure. This restarts the adapter description table. When adapter description table processing is completed, an adapter action routine will create an Exit State Machine control event, which is placed in the LAST EVENT field in the data structure associated with the adapter. Control is then passed to the sequencer.

When the sequencer receives an Exit State Machine control event from a description table, it will pass control to the process defined by the top record of the stack. Control is passed to the description table which created this top record. This passing of control to the description table allows the cell processor of that description table to interrogate the CURRENT STATE field in the data structure associated with the description table. This information along with the information from the LAST EVENT field is used by the cell processor to select the state event table cell from which the required action list routine is activated. If processing of the description table is completed, the action routine will create an Exit State Machine control event which is entered into the LAST EVENT field of the data structure. Control is returned to the sequencer.

The sequencer, detecting the Exit State Machine control event pops the stack (i.e., the top record is deleted). If the stack is not empty the sequencer continues the process by returning control to the description table which created the next top record. When the stack is empty, the sequencer then proceeds to loop through the post-processing pseudo device description tables for post-processing of data.

Post-process pseudo device description tables are activated when the CONTROL BYTE field of the pseudo device data structure is coded for post-processing. The pseudo device description tables operate in a manner similar to device and adapter description tables. The sequencer passes control to the cell processor of the selected pseudo device description table. The pseudo device description table process continues by interrogating the DEVICE TYPE field for the requested device to determine if processing is to take place on data in the data buffer. Pseudo device post-processing continues in a manner similar to pre-processing as described above, looping through the set of post-processing pseudo device description tables determining which of them is to be activated.

If post-processing is not required or if processing of the post-process pseudo device description tables has been completed, then processing of the kernel request is completed. Upon such completion, a kernel completion error code (e.g., 0) is generated based on the kernel error codes from the requested device data structure. This completion error code is sent to the environmental map where it is translated into the corresponding operating system completion error code, thus completing the request. The environmental map converts the kernel error code response to operating system device error codes.

K. Example of Build BPS

The following is an example of the kernel and description tables responding to an operating system request to build a BIOS parameter block (BPB). This request requires information to be written to the physical device. After setting up the global data structure, the CURRENT STATE and LAST EVENT fields are empty, i.e., they have no entries. The sequencer receives a kernel request to Build BPB which is request number 2 (See Table 7). The sequencer places entries into the CURRENT STATE and LAST EVENT fields of the global data structure. The LAST EVENT entry is the kernel request number (2 in this example). The CURRENT STATE entry is zero—Init because this is the first pass through the state event table of the description table. With each first request to a description table, the CURRENT STATE is zero.

The Cell Processor is then called by the sequencer for execution (i.e. the calling routine in the sequencer places onto the stack its return address, then the calling routine branches to the called routine (cell processor) for execution of the cell processor). The cell processor (the called routine) uses the content of the device's CURRENT STATE and LAST EVENT fields as indices into the state event table. The indices (row and column) determine the state event table cell. The cell contains an action reference and a Next State.

The action reference is a byte (0–255). Each action reference number corresponds to a specific action list routine. There is an action pointer array which is comprised of an array of addresses for the action list routines. The action reference number contained in the cell is an index into this action pointer array.

The beginning address of the action pointer array is already known by the cell processor. This address is linked into the cell processor program as part of the compiling of the description table. The address of the cell processor is contained in the CELL PROCESSOR ADDRESS field of the description table's entry in the global data structure. The action reference number which the cell processor receives from the cell in the state event table is an offset into the action pointer array for the desired action routine. The cell processor receives from the action pointer array the address of the desired action routine. The cell processor places this address into a register and calls the action routine at that address for execution.

Action routines are embodied in the code of each description table. There is, for example, an action routine which builds a BPB. Other action routines implement other kernel requests. Action routines are not limited to the implementation of kernel requests. They include any other software routines desired by the creator of the description table. Action routines can be open ended in function. For example, encryption and decryption, compression and decompression of data, logical device processing and cache programs are other action routines. Action routines can cause control events.

The action routine is executed and creates BPB data in the data buffer. See FIG. 6. In addition, the action routine creates an adapter request and places it in the queue as shown in FIG. 6. This is in preparation for activating an adapter description table which will cause the BPB information to be written to the device identified in the kernel request.

The action routine places into the LAST EVENT field of its device data structure an entry which is Invoke Adapter control event (OxFC from Table 9). Control is then returned to the cell processor. Control is passed to the sequencer by the cell processor branching to the address which is on the top of the stack. This address was placed on the top of the stack by the sequencer when it called the cell processor.

The sequencer places onto the stack the return address to the cell processor. It then reads from the device description table's state event table the Next State number which is in the cell which is at the intersection of the CURRENT STATE and LAST EVENT indices. The sequencer places this next state number into the CURRENT STATE field of the device data structure.

The sequencer, detecting an Invoke Adapter control event in the LAST EVENT field for the device data structure, reads from the device data structure, the ADAPTER NUMBER (in the ADAPTER NUMBER field) of the adapter to which the device is attached.

The sequencer places into the CURRENT STATE field the value zero, indicating an initial state. The SCSI Command from the adapter packet is placed into the LAST EVENT field of the adapter data structure.

Using the entries in the adapter data structure, the sequencer uses the CELL PROCESSOR ADDRESS field of the adapter's data structure and calls the adapter description table's cell processor. The SCSI COMMAND DESCRIPTION field contains a Write Data command which is the LAST EVENT for the adapter description table. The adapter description table cell processor uses the intersection of the CURRENT STATE and LAST EVENT fields to determine the action routine which is to be invoked. The invoked action routine, write data, writes the contents of the data buffer to the device. The adapter request contains the address of the data buffer in the PHYSICAL DATA POINTER and VIRTUAL DATA POINTER fields. The amount of data is contained in the LENGTH OF DATA BUFFER field of the adapter request.

Upon completion of the write action of the adapter description table, the adapter description table creates an Exit State Machine control event and passes control back to the sequencer. The sequencer, detecting this Exit State Machine control event, branches to the address on the top of the stack. This is the return address to the device description table cell processor which caused the adapter description table to be activated. The sequencer passes control to the device description table. The contents of the LAST EVENT field and the CURRENT STATE fields for the device description table are used by the cell processor of the device description table. The action routine corresponding to the action reference of the state event table cell at the intersection of these two indices contains the instructions to create an Exit State Machine control event. After setting up the Exit State Machine control event in the LAST EVENT field of the device data structure, control is passed back to the sequencer.

The sequencer, detecting this control event, pops the stack, removing the address of the device description table cell processor from the stack, and passes a No Error error response to the Environmental Map. The Environmental map transforms this No Error response into the format required by the operating system and returns control back to the operating system. This completes the Build BPB Request.

L. Logical Device Example

The operation of the sequencer and a number of device and adapter description tables can be further explained using Logical Device DU and associated default devices and adapters in the example configuration of FIG. 2. The Logical Device DU description table represents a duplex writing logical device which will write the same data to two different physical devices. FIG. 12, shows an overview of this operation. This example describes the process of performing a duplex write e.g. the same data is written or mirrored to two devices. This is done in a manner which is transparent to the operating system. The kernel request for write is request number 4. This request number will be used in this example.

In this example, the operating system creates a write request to the block device, Unit 1 (as shown in FIG. 2). The environmental map translates the operating system request into a kernel request (number 4) which is processed by the sequencer. Shown below are simplified state event tables for the description tables of Logical Device DU, Default Devices B1 and B2 and Adapters 1 and 2. Events are shown as columns in the state event tables. States are shown as rows. One or more cells are shown in the tables. The content of the cell describes the key action routine functions. In the actual state event table, this entry in the cell is an action reference to the actual action routine in the action list. The Next State reference is given below the action routine function. If Next State 1 is shown, the Next State for the description table will be state 1. These simplified sample tables can be followed in the operational example described below.

DU LOGICAL DEVICE DESCRIPTION TABLE STATE EVENT TABLE

|         | Events |   |   |   |                                        |
|---------|--------|---|---|---|----------------------------------------|
|         | 0      | 1 | 2 | 3 | 4 (Write)                              |
| State 0 |        |   |   |   | Invoke Default Device                  |
|         |        |   |   |   | Next State 1                           |
| State 1 |        |   |   |   | Invoke Default Device                  |
|         |        |   |   |   | Next State 2                           |
| State 2 |        |   |   |   | Exit State Machine                     |
|         |        |   |   |   | Next State 0                           |

DEFAULT DEVICE B1 AND B2 DESCRIPTION TABLE EVENT STATE TABLES

For purposes of this example, the state event tables for Default Devices B1 and B2 are the same. In general, they would not be the same.

|         | Events |   |   |   |                                                         |
|---------|--------|---|---|---|---------------------------------------------------------|
|         | 0      | 1 | 2 | 3 | 4 (Write)                                               |
| State 0 |        |   |   |   | Build Adapter Table Request Packet                      |
|         |        |   |   |   | Invoke Adapter Control Event                            |
|         |        |   |   |   | Next State 1                                            |
| State 1 |        |   |   |   | Exit State Machine                                      |
|         |        |   |   |   | Next State 0                                            |

ADAPTERS 1 AND 2 DESCRIPTION TABLE STATE EVENT TABLES

For purposes of this example, the state event tables for Adapters 1 and 2 are the same. In general, the two state event tables would be different for different types of adapters. In addition, the convention of the adapter state event tables is for the first column to be the event where any request is made. The other event columns are used to sequence the other actions of the adapter.

|         | Events                |
|---------|-----------------------|
|         | 0                     |
| State 0 | Receive Request       |
|         | Control Adapter       |
|         | Exit State Machine    |
|         | Next State 0          |

The sequencer first checks to see if pre-processing of data in the data buffer is required. The sequencer interrogates the CONTROL BYTE field of the data structure entry for each of the pseudo device description tables. It finds from the content of the CONTROL BYTE fields of the pseudo device description tables that pre-processing is desired. The sequencer then loops through the designated pseudo devices in turn. P1 is the first pseudo device in the ordered sequence shown in the global data structure. When the Pseudo Device P1 description table is activated, it determines that it can process data in the data buffer because it is programmed for DEVICE TYPEs 81 and 80. DEVICE TYPE 81 is contained in the DEVICE TYPE field of the Logical Device DU data structure. This matches the device type 81 for which pseudo device P1 description table. This process is repeated for the pseudo device description table P3 which also has its CONTROL BYTE contents indicating it is a pre-processing pseudo device. The Pseudo device P3 description table, however, is programmed to respond only to DEVICE TYPE 80. This does not match the 81 contained in Logical Device DU's data structure. Therefore, the Pseudo Device P3 description table is not activated and does not process data in the data buffer. At this point the sequencer has finished activating the pseudo device description tables for pre-processing.

Control is passed by the sequencer to the Logical Device DU description table. The sequencer passes control by calling the cell processor of the Logical Device DU description table. The cell processor and state event table are used to select the needed action routine from the action list. The CURRENT STATE field of the Logical Device DU data structure is set to the initial state (zero). The LAST EVENT field is set to 4 (Write). The cell processor of the Logical Device DU description table gives control to the action routine referenced by the intersection of row 0 (Init) and column 4 (write) in the cell processor's state event table. This action routine creates an Invoke Default Device control event and places it into the LAST EVENT field of the Logical Device DU data structure. Control is passed back to the sequencer.

The sequencer extracts the Next State (1) information from Logical Device DU's state event table and places this Next State number in the CURRENT STATE field of Logical Device DU's data structure. Information required to return control to the cell processor of the Logical Device DU description table is pushed onto the recursive control stack shown in FIG. 6.

The sequencer interrogates the LAST EVENT field of the Logical Device DU data structure. It reads the Invoke Default Device control event previously placed in this field and from this control event determines that a default device is to be activated. The sequencer references the Logical Device DU data structure and finds that the DEFAULT BASE is 0 and that two default devices are to be considered. Since this is the first pass through the sequencer for the Logical Device DU description table, the first default device in the ordered sequence of default devices (eg. B1—base 0) is selected. The sequencer increments a counter in order to know the number of passes through default description tables for each new kernel request. This counter is reset to zero with each new kernel request. The sequencer sets the CURRENT STATE field of Default Device B1 to zero (init) and the LAST EVENT field of Default Device B1 to the request number contained in the kernel request (4). Control is passed to the cell processor of the Default Device B1 description table.

The Cell Processor of the Default Device B1 description table uses the CURRENT STATE and LAST EVENT of the Default Device B1 data structure to select an action routine. The reference for the action routine will be at the intersection of row 0 and column 4 of the state event table of the Default Device B1 description. As the selected action routine is executed, the control event Invoke Adapter is placed into the LAST EVENT field of the Default Device B1 data structure. In addition, an adapter request is created and placed onto the adapter request queue. Control is passed back to the sequencer which sets up the CURRENT STATE field for the Default Device B1 data structure by extracting the Next State from the state event table of the Default Device B1 description table. In addition, the return address for the Default Device B1 description table cell processor is pushed onto the recursive stack to set up for a return.

The sequencer then responds to the Invoke Adapter control event as contained in the LAST EVENT field of the Default Device B1 data structure. The sequencer interrogates the ADAPTER NUMBER field in the configuration information in the Default Device B1 data structure and selects the correct adapter description table.

Adapter description tables use the convention that the first event number for an adapter description table is 0. Therefore the CURRENT STATE (0) and LAST EVENT (0) entries for the Adapter 1 data structure are set up by the sequencer and control is passed to the cell processor for the Adapter 1 description table. The Adapter 1 description table cell processor then selects an action reference from its state event table (row 0, column 0) and passes control to the referenced action routine. This action routine sets up the required registers in the adapter and causes the attached device to transfer data from the data buffer to the device. This is the first of two write data operations. Since logical device DU is a duplex writing device, the same data also needs to be written to another device. This process continues as described below.

When the data transfer from the data buffer to the physical device is completed, the Adapter 1 description table action routine creates an Exit State Machine control event and passes control back to the sequencer.

The sequencer in response to the Exit State Machine control event from the Adapter 1 description table, passes control to the cell processor address which is on the top of the recursive stack. This returns control to the cell processor of the Default Device B1 description table. The CURRENT STATE field of the data structure of Default Device B1 contains the CURRENT STATE number (1) which was previously setup by the sequencer as described above. This CURRENT STATE responds when the Invoke Adapter control event is completed. Since the adapter description table has completed writing to the first device, as the default device B1 description table receives control, and the data has completed writing as requested. The cell processor selects the action routine referenced in the state event table cell at the intersection of the CURRENT STATE and the LAST EVENT entries. This selected action routine creates an Exit State Machine control event which is placed into the LAST EVENT field of the Default Device B1 data structure field. Control is passed back to the sequencer.

The sequencer, in response to the Exit State Machine control event, places the Next State entry from the Default Device B1 state event table cell last accessed into the LAST EVENT field of the Default Device B1 data structure. In addition, the sequencer pops the recursive control stack. This removes the linkage to the Default Device B1 description table and places the linkage to the Logical Device DU description table to the top of the stack. Control is then transferred by the sequencer to the cell processor of the Logical Device DU description table.

Since the last action of the Local Device DU description table was to set up the CURRENT STATE field entry, the cell processor invokes the action routine referenced in its state event table which is in the cell located at the intersection of the CURRENT STATE (1) and LAST EVENT (4) fields. This action routine creates an Invoke Default Device control event which is placed into the LAST EVENT field of the Logical Device DU data structure. Control is passed back to the sequencer where the address of the cell processor is pushed onto the recursive control stack. The Next State (2) is selected from the state event table of the Logical Device DU description table and placed into the Logical Device DU data structure CURRENT STATE field.

Control is then passed to the Default Device B2 description table by the sequencer. The correct Default Device (B2) is selected by the sequencer. The sequencer maintains a counter of the number of default devices used for the current kernel request. The DEFAULT BASE number of the Logical Device DU data structure is used as the base number referenced against the ordered sequence of default devices in the global data structure. The default device counter of the sequencer is used as an offset into the ordered sequence of default devices. The selected default device description table is then selected by the sequencer. Control is passed by the sequencer to this default device description table, i.e., to the Default Device B2 description table.

The Default Device B2 description table then proceeds in the same manner as described above to create an adapter request and to create an Invoke Adapter control event. The Adapter 2 description table is then invoked. This causes the data in the data buffer to be written to the second device (Default Device B2). This completes the duplex writing process. The Adapter 2 description table creates an exit state machine control event passes control to the sequencer. The sequencer returns control to the Default Device B2 description table which creates an Exit State Machine control event. The sequencer then returns to the Logical Device DU description table. This description table has now completed its operation, therefore it creates an Exit State Machine control event. The sequencer then initiates post-processing by pseudo devices.

The sequencer interrogates the CONTROL BYTEs for the pseudo devices and finds that the Pseudo Device P2 description table is to be activated. Control is passed to the Pseudo Device P2 description table. The Pseudo Device P2 description table is programmed to process DEVICE TYPE 81. This matches the contents of the DEVICE TYPE field of the Logical Device DU data structure. The Pseudo Device P2 description table processes the data in the data buffer.

After the sequencer loops through all post-processing pseudo devices, the ERROR field of the Logical Device DU data structure is interrogated and used to create the kernel error response which is translated by the environmental map into an operating system response (No error). This completes the processing of the operating system request.

M. OS/2 Kernel

The OS/2 kernel is the simplest of the kernels in this example of the invention because OS/2 operating system requests were adapted as the model for the set of kernel requests used by all kernels in this example.

The OS/2 kernel is comprised of seven source modules. The following is a list of the names of these source modules:

OS2_HDR.ASM
OAD_DATA.C
OS2_DATA.C
OS2_ENV.C
OAD_STGY.C
OAD_IMGR.C
OAD_INIT.C

Each of the above source modules is assembled or compiled and then linked with the devhlp.lib library as well as the standard OS/2 libraries. The following sections describes each of the modules that make-up the OS/2 kernel.

(1) OS2_HDR.ASM

OS2_HDR.ASM is the assembler source module that reorders the segments in the OS/2 kernel. This is necessary because the specification of an OS/2 device driver requires that the data segment of the device driver precedes the code segment. This requirement ensures that the device driver headers will always be the first items in the device driver.

(2) OAD_DATA.C

The OAD_DATA.C source file is the file that contains the global data present in the OS/2 kernel. The first item of data that is present in the OAD_DATA.C file is the OS/2 kernel headers.

The kernel headers are organized as four character device driver headers. Each of these character device driver headers is initialized to a valid state that will be over-written with the information from the configuration file when a character device record is read from the configuration file. Furthermore, each of these character device driver headers is linked to the next character device driver header so that OS/2 will load them as one device driver file.

The last of the character device driver headers is statically linked to the block device driver header. The block device driver header is initialized to a loadable state. Once the actual number of block device drivers is known, by completing the loading process as indicated in the configuration file, then the block device driver header is updated to reflect the proper count of block devices in the system.

OAD_DATA.C also contains the global data area that contains the arrays of adapter data structures, real device data structures, logical device data structures, default device data structures and pseudo device data structures. Other global kernel data is contained in this file, such as messages.

(3) OS2_DATA.C

The OS2_DATA.C file is the file that contains the OS/2 specific global data. In the case of the OS/2 kernel the only elements of this file are the strings indicating the proper carriage return and line feed characters, and the proper name for the CONFIG.OAD file, and the proper name of the library directory.

(4) OS2_ENV.C

The OS2_ENV.C source module serves two purposes. First, this file contains the set of functions that are addressed in the OS/2 kernel headers. Each time that an OS/2 operating system request is issued to any of the device description tables linked to the OS/2 kernel, one of the functions in this file is executed.

There are four character device functions and one block device function defined in this file. Once the operating system request has caused one of these functions to be executed then that specific function will call the OS2_Setup function.

OS2_Setup is responsible for transforming the register-based conventions used to point to the OS/2 operating system request block into a C-style FAR pointer. Once this pointer has been created then the Strategy routine of the OS/2 kernel is called.

Second, at initialization time of the OS/2 kernel there may be operating system specific initialization functions that are required. The specific operating environment activity required for OS/2 is to change the access rights of the code segment selectors for all of the loaded description tables from a read-write status to that of a read-write-execute status.

If the above alteration of the description table code segment selectors' access rights byte is not performed then the first time that the OS/2 kernel invokes one of the description tables a general protection fault will occur.

(5) OAD_STGY.C

The OAD_STGY.C module is responsible for the major portions of operational control in the kernel. When a kernel request is received and the strategy routine is executed then the following occurs.

Process pre-processing pseudo device description tables

Process real, logical and/or default device description table(s)

Process adapter description table(s)

Process post-processing pseudo device description tables (6) OAD_IMGR.C

The OAD_IMGR.C source module is an interrupt manager responsible for managing the proper operation of interrupts. Interrupts to the kernel are routed to this interrupt manager.

Once the interrupt manager begins execution it attempts to locate an adapter description table that has posted the status of waiting for interrupt to occur. Once such an adapter description table is located, a check is made to see if the interrupt request (IRQ) of the current interrupt and that of the adapter (ADP_irq) match. If this condition is true then the interrupt manager performs the following tasks.

Adapter description tables that meet the above criteria are issued a RUN DevHlp routine call. This call will cause the process that is waiting for the I/0 to complete to be awakened at the earliest possible moment. Once the waiting process is awakened, the I/0 can complete and the process can continue to compete for its share of time from the OS/2 operating system.

(7) OAD_INIT.C

The OAD_INIT.C source module is the logic that is shared between all kernels in library 10 of FIG. 1. This file is responsible for the initialization process. The complete processing of the configuration file (CONFIG.OAD) and the loading of the description tables is performed by this module. Since this module is used only at initialization time it is advantageous to remove from computer memory as much of this module's code and data as possible after initialization.

N. MS-DOS Kernel

MS-DOS is a single-tasking, single-thread operating system. Furthermore, MS-DOS is not re-entrant. Therefore, when an MS-DOS operating system request is being processed by a device driver it is not possible for the device driver to request the MS-DOS operating system to perform any services. This is especially difficult when one of the design requirements of the kernel is to be able to open the CONFIG.OAD file, read from it and then close it.

The MS-DOS kernel, in this embodiment of the invention, is based on an OS/2 device driver model. This requires that all addresses be developed as virtual addresses. The concept of a virtual address in protected mode is different than the concept of a virtual address in real mode.

The protected mode virtual addresses use one more level of indirection than do the real mode virtual addresses. This added level of indirection in supplied virtual addresses causes a severe problem. The description tables assume that execution is occurring in an environment with the protected mode virtual addresses. Therefore, the MS-DOS kernel must synthesize all virtual addresses in the device driver environment for proper execution.

The MS-DOS kernel is comprised of nine source modules. The following is a list of the names of these source modules:

DOS_HDR.ASM
OAD_DATA.C
DOS_DATA.C
DOS_ENV.C
OAD_STGY.C
DOS_API.C
DOS_HLP.C
OAD_IMGR.C
OAD_INIT.C

Each of the above source modules is assembled or compiled and then linked with the devhlp.lib library as well as the standard MS-DOS C library. The resultant output of the linkage process is an MS-DOS executable file that must be converted from the DOS .EXE format into the DOS .COM file format. This conversion is performed using the EXE2BIN utility supplied with MS-DOS.

(1) DOS HDR.ASM

DOS_HDR.ASM is the assembler source module that reorders the segments in the MS-DOS kernel. This is necessary because the specification of an MS-DOS device driver requires that the data segment of the device driver precede the code segment. This requirement is placed upon the device drivers so that the device driver headers will always be the first items in the device driver.

(2) OAD_DATA.C

The OAD DATA.C source file is the file that contains all of the global data present in the MS-DOS kernel. The first items of data that are present in the OAD_DATA.C file are the MS-DOS kernel headers.

The kernel headers are organized as four character device driver headers. Each of these character device driver headers is initialized to a valid state that will be over-written with the information from the configuration file when a character device record is read from the configuration file. Furthermore, each of these character device driver headers is linked to the next character device driver header so that MS-DOS will load them as one device driver file.

The last of the character device driver headers is statically linked to the block device driver header. The block device driver header is initialized to a loadable state. Once the actual number of block device drivers is known, by completing the loading process as indicated in the configuration file, then the block device driver header is updated to reflect the proper count of block devices in the system.

OAD_DATA.C also contains the global data area that contains the arrays of adapter structures, real device data structures, logical device data structures, default device data structures and pseudo device data structures. Various other global data is contained in this file, such as messages.

(3) DOS_DATA.C

The DOS_DATA.C file is the file that contains the MS-DOS specific global data. This file contains strings indicating the proper carriage return and line feed characters, the proper name for the CONFIG.OAD file, the proper name of the MS-DOS library directory and MS-DOS specific data items.

This operating system dependent data module is not as small as its counterpart module in the OS/2 kernel because many of the facilities of the OS/2 device driver model must be synthesized in the MS-DOS kernel. For example, the concept of physical memory allocation with respect to GDT Selectors is alien to MS-DOS. Therefore, a memory allocation facility is built into the MS-DOS kernel. The memory required to store the storage specifics is maintained in this data file.

Other data items relating to the implementation of the OS/2 API facilities are defined in this module. This includes the identification of the boot device, a temporary sector buffer required when initializing and other MS-DOS file specific variables required in the implementation of the dynamic loading process.

(4) DOS_ENV.C

The DOS_ENV.C source file contains the environmental map. The DOS_ENV.C source module serves three specific purposes. First, this file contains the set of functions that are addressed in the MS-DOS kernel headers. Each time that an MS-DOS operating system request is issued to any of the device description tables linked to the kernel, one of the functions in this file is immediately executed.

There are four character device functions and one block device function defined in this file. Once the operating system request has caused one of these functions to be executed, then that specific function will call the DOS_Setup function.

DOS_Setup is responsible for performing the following operations.

Saving all registers

Transferring to a local stack

Translating an operating system request to a kernel request

Invoking the strategy routine

Transforming the kernel response to an MS-DOS response

Transferring back to original stack

Restoring all registers

This file is also responsible for address transformations that occur in the MS-DOS environment.

(5) OAD_STGY.C

The OAD_STGY.C source module is responsible for the major portions of operational control in the MS-DOS kernel. When a kernel request is received and the strategy routine is executed then the following occurs.

Process all pre-processing pseudo device description tables

Process real, logical and/or default device description table(s)

Process adapter description table(s)

Process post-processing pseudo device description tables (6) DOS_API.C

The DOS_API.C source module is responsible for implementing the API function calls (initialization routines) as required by the kernel.

(7) DOS_HLP.C

The DOS_HLP.C source file contains the implementation of the DevHlp routines for the MS-DOS kernel.

(8) OAD_IMGR.C

The OAD_IMGR.C source module is an interrupt manager responsible for managing the proper operation of interrupts. Interrupts to the kernel are routed to this interrupt manager.

Once the interrupt manager beings execution it attempts to locate an adapter description table that has posted the status of waiting for interrupt to occur. Once such an adapter description table is located, a check is made to see if the interrupt request (IRQ) of the current interrupt and that of the adapter (ADP_irq) match. If this condition is true then the interrupt manager performs the following tasks.

Adapter description tables that meet the above criteria are issued a RUN DevHlp routine call. This call will cause the process that is waiting for the I/0 to complete to be awakened at the earliest possible moment. In the MS-DOS environment of single-task operation the RUN call is simply a dummy call because there is only one task executing at a time.

(9) OAD_INIT.C

The OAD_INIT.C source module is the logic that is shared between all kernels in library 10 of FIG. 1. This file is responsible for the initialization process. The complete processing of the configuration file (CONFIG.OAD) and the loading of description tables is performed by this module. Since this module is used only at initialization time it is advantageous to remove from computer memory as much of this module's code and data as possible after initialization.

O. Unix Kernel

The Unix kernel of this embodiment of the invention has many of the same problems that are encountered in the implementation of the MS-DOS kernel. However, the Unix kernel operates in protected mode. Therefore, the level of address indirection that occurs through the descriptor tables (LDT and GDT) does not have to be synthesized.

The Unix kernel has the ability to perform the following API functions (initialization routines) during initialization.

DosRead

DosClose

DosOpen

DosChgFilePtr

DosPutMessage

Out of the above API functions (initialization routines) the Unix kernel has access to only the functional equivalent of DosPutMessage in the Unix operating system. The rest of the API functions that deal with file I/O do not have a functional equivalent within the Unix operating system. Therefore, in order to implement the Unix kernel it was necessary to develop these functions (initialization routines).

The Unix kernel is comprised of nineteen source modules. The following is a list of the names of these source modules:

ALLOCATE.C

ALLOCPHY.C

BLOCK.C

FREEPHYS.C

PHYSTOGD.C

PHYSTOVI.C

RUN.C

SETIRQ.C

UNPHYSTO.C

VIRTTOPH.C

ZENDCODE.C

OAD_DATA.C

UnixDATA.C

Unix_ENV.C

OAD_STGY.C

Unix_API.C

Unix_HLP.C
OAD_IMGR.C
OAD_INIT.C

The process of creating the Unix kernel is a multi-step process. The first operation that must be performed is to compile all of the source modules that are listed above. The resultant object modules are then transferred to the Unix environment.

ALLOCATE.C

AllocateGDTSel is used to allocate a set of GDT selectors for the kernel to use for bimodal task-time and interrupt-time operations. The bimodal Unix kernel supports both real mode and protect mode I/O and transfers data without being dependent on the current mode of operations. In addition, the interrupt handler of the bimodal kernel addresses data buffers regardless of the context of the current process. The PhysToGDTSelector function is used to establish the addressability of a GDT selector.

ALLOCPHYS.C

This function allocates physical memory as needed by the kernel and its linked description tables.

BLOCK.C

The return from the Block call indicates whether the "wakeup" occurred as the result of a RUN call or an expiration of the time limit.

FREEPHYS.C

Any memory that the kernel allocated by way of the AllocPhys call should be released prior to terminating the operation of the kernel. The major use of FreePhys in the Unix kernel is to ensure that the physical memory that was allocated for description table loading is released if an error occurs in the loading process.

PHYSTOGD.C

PhysToGDTSel is used to provide addressability through a GDT selector to data. The Unix kernel supports both real and protect mode I/O and must be able to transfer data without being dependent on the current mode of operations. In addition, the interrupt handler of the Unix kernel must be able to address data buffers regardless of the context of the current process. The GDT selector's addressability will remain valid and the same until another PhysToGDTSel call is made for the same selector. The AllocateGDTSel function is used at INIT time to allocate the GDT selectors that the device driver may use with the PhysToGDTSel.

PHYSTOVI.C

PhysToVirt will return the virtual address of a physical address. PhysToVirt will leave its result in either ES:DI or DS:SI, giving the Unix kernel the ability to move strings.

RUN.C

Run returns immediately to the caller; the awakened threads will be run at the next available opportunity. Run is often called at interrupt time. Run operates in close cooperation with the Block routine.

SETIRQ.C

SetIRQ will register an interrupt which is used by the Unix kernel.

UNPHYSTO.C

This function forms part of the structure of mode-dependent addressing on behalf of the Unix kernel.

VIRTTOPH.C

This function is typically used to convert a virtual address supplied by a process by way of a generic IOCTL, In order that the computer memory be accessed at interrupt time.

ZENDCODE.C

ZendCode is a place holder in the object file to indicate the end of the code segment. This is analogous to _text in Unix implementations.

OAD_DATA.C

The OAD_DATA.C source file is the file that contains all of the global data present in the Unix kernel. The first items of data that are present in the OAD_DATA.C file are the kernel headers. Although Unix does not require these device driver headers they are left in the Unix kernel for compatibility with the other kernels.

OAD_DATA.C also contains the global data area that contains the arrays of adapter data structures, real device data structures, logical device data structures, default device data structures and pseudo device data structures. Other global kernel data is contained in this file, such as messages.

UnixDATA.C

The UnixDATA.C file is the file that contains the Unix specific global data. In the case of the Unix kernel not only are the elements of this file the strings indicating the proper carriage return and line feed characters, the proper name for the configuration file, and the proper name of the Unix library directory; but also Unix specific data items.

Other data items relating to the implementation of the kernel API facilities are defined in this module. This includes the identification of the boot device, a temporary sector buffer required when initializing and other Unix file specific variables required in the linking of description tables.

Unix_ENV.C

The Unix_ENV.C source file contains the environmental map for the Unix kernel. This file contains the set of functions that are addressed in the Unix kernel headers. At initialization time of the kernel there are Unix system initialization functions that are required. The Unix kernel converts the allocated GDT selectors for the code space to Read/Write/Execute mode from the Read/Write mode as initially initialized.

Finally, this file is responsible for the creation of kernel requests. Unix requests are mapped into the appropriate kernel requests and then processed by the kernel and its linked description tables.

OAD_STGY.C

The OAD_STGY.C source module is responsible for operational control in the kernel. When kernel request is received, the strategy routine causes the following description tables to be executed.

Saving all registers

Transferring to a local stack

Translating an operating system request to a kernel request

Invoking the strategy routine

Transforming the kernel response to an MS-DOS response

Transferring back to original stack

Restoring all registers

Unix_API.C

The Unix_API.C source module is responsible for implementing the kernel API function calls (initialization routines). Only the API functions that are utilized in the kernel are implemented in this file.

Unix_HLP.C

The Unix_HLP.C source file contains the implementation of the DevHlp service map routines for the Unix kernel. Although there are a number of the OS/2 DevHlp routines that are not presently used in the Unix kernel a mechanism exists so that they may be invoked without adverse results.

The implementation of a Unix kernel DevHlp routine repository is provided. This function is the target of all of the DevHlp routines that are invoked through the devhlp pointer.

The devhlp pointer is initialized to this main DevHlp function that processes all of the Unix required DevHlp routines. Any invocations of this function with DevHlp values that were not implemented simply respond with a successful response and return to the caller. Therefore, OS/2 DevHlp routine calls that did not need to be implemented in the Unix environment could still be invoked by common routines in the kernels.

OAD_IMGR.C

The OAD_IMGR.C source module is responsible for managing the proper operating of the interrupts in the OAD environment. All interrupts in the kernel are routed to the interrupt manager.

When the interrupt manager begins execution it attempts to locate an adapter description table that has posted the status of waiting for an interrupt to occur. Once such an adapter description table is located with this particular status then a check is made to see if the interrupt request (IRQ) of the current interrupt and that of the adapter (ADP_irq) match. If this condition is true then the interrupt manager performs the following tasks.

All adapter description tables that meet the above criteria are issued a RUN DevHlp call. This call will cause the process that is waiting for the I/O to complete to be awakened at the earliest possible moment. Once the awaiting process is awakened then the I/O can complete and the process can continue to compete for its share of time from Unix.

OAD_INIT.C

The OAD_INIT.C source module is the logic that is shared between all kernels. This file is responsible for the kernel initialization process. The processing of the configuration file (CONFIG.OAD) and the loading of description files is performed by this source module. Since this module is used only at initialization time it is desirable to discard as much of this module's code and data as possible after its execution.

P. Combining and Partitioning Description Tables

Although generally not preferred, device description tables and adapter description tables can be combined to form a single description table. An example is the description table created to support the IBM 3363 WORM device and included in the accompanying source code. This description table processes kernel requests, creates device commands, creates adapter commands and issues device and adapter commands.

When additional factors of complexity are discovered (e.g. operating system file system to device file system mappings or translations), additional interfaces can be created or defined to decouple these factors, i.e., a device description table (or adapter description table) can be partitioned. Separate mappings or translation functions can be isolated into separate description tables.

This invention includes both combining and partitioning of description table and the appended claims are intended to include the same within their scope either literally or as equivalents.

Q. Source Code

Accompanying this description of the invention are source code listings of computer programs and data for an example of this invention. These source code listings are provided on microfiche. These source code listings are a part of this description of the invention and are incorporated by reference herein. The source code includes the following:

| | |
|---|---|
| Kernel (MS-DOS) | |
| Kernel (OS/2) | |
| Kernel (Unix) | |
| Device description table | (Quantum 40 block device description table which can be used as either a default or a real device description table) |
| Device description table | (Bernoulli Beta 20 block device description table which can be used as either a default or a real device description table) |
| Device description table | (Bernoulli Beta 44 block device description table which can be used as either a default or a real device description table) |
| Device description table | (Viper character device description table which can be used as either a default or a real device description table) |
| Device description table | (CD-ROM character device description table which can be used as either a default or a real device description table) |
| Description table | (IBM 3363 WORM description table which is a logical device description table. In addition, this description table functions as an adapter description table) |
| Adapter description table | (PC2 adapter description table which controls a PIO mapped adapter) |
| Adapter Description table | (PC4 adapter description table which controls a DMA mapped adapter) |
| Configuration file | |
| Configuration utility | |

R. Modifications and Adaptations

The foregoing description of our invention and Sections VI, VII and VIII and the drawings so fully reveal the general nature and the innovations and advantages of our invention that others can readily modify such invention and/or adapt it for various applications without departing from its general concepts, and, therefore such adaptations and modifications should be and are intended to be comprehended within the meaning and range of the claims appended hereto and their equivalents, which claims define subject matter regarded by us to be our invention.

VI. DEFINITIONS

Some terms are briefly described below. These descriptions or definitions are not intended to supercede the more thorough descriptions and definitions provided elsewhere in this disclosure and the drawings.

Action List: The set or list of action routines that are associated with or part of a description table.

Action Routine: An action routine (or action) is a software routine or computer program that can be executed by a digital computer to cause a desired result, action or function (i.e. the action routine function). For example, an action routine function can be a control event (e.g. exit state machine, invoke adapter description table, invoke default device description table, etc.) or another kind of function (e.g. creation of adapter request, creation of an adapter command, etc.).

Adapter: The hardware which attaches to the computer (e.g. through the computer's hardware data bus) and which provides for the connection or attachment of one or more devices to the computer.

Block Device: A block device is a physical device defined by the operating system that operates with fixed length records; fixed disk drives, Bernoulli drives, and floppy drives are examples of block devices.

Character Device: A character device is a physical device defined by the operating system that operates with variable length records; tape drives and printers are examples of character devices.

Computer Memory: Computer memory means the memory of a digital computer and generally is assumed to be random access memory (RAM) but in other embodiments of the invention could be read only memory (ROM), programmable read only memory (PROM), electrically alterable programmable read only memory (EPROM) and/or other memories now known or later developed.

Computer Memory Storage Medium. Computer memory storage medium includes computer memory as well as peripheral memory storage media such as hard disks, diskettes, magnetic tapes, CD-ROM, Bernoulli cartridges, and other memory media now known or later developed. A computer memory storage medium can be any tangible medium (or combination of tangible media) in which computer programs or data can be stored or recorded or from which computer programs or data can be executed, read, transferred or utilized.

Configuration File: The Configuration file includes information about attached adapters and devices and their description tables. When a kernel is initialized and one or more description tables are loaded and linked to the kernel, a configuration file is used to provide the kernel with information about the user's configuration. The kernel looks for the configuration file under its file name (e.g. CONFIG.OAD). The configuration file is generated by the configuration utility program (e.g. GENOAD.EXE).

Configuration Utility: A computer program which is used by the user to create the desired configuration file.

Control Event: A control event can be created by an action routine.

Data Structure: A data structure is a section of computer memory comprised of fields. These fields define the data structure. Information concerning devices and device description tables is entered into device data structures. Information concerning adapters and adapter description tables is entered into adapter data structures. Device and adapter data structures can be combined into a global data structure.

Default Device: A default device is a block or character device that is not assigned a unit number or character device name by the host operating system. Default devices are used to support logical devices.

Description Table: Description tables are independent software modules which contain the code and data necessary to identify the type of table (adapter and/or device) and to describe the structure, operation, and/or performance of its functional object (e.g., the host adapter board, physical device, pseudo device, logical device, etc.). While the kernel is specific to the operating system, description tables are specific to the object they describe. Description tables can be independently linked to the kernel as needed to match the computer system's configuration.

Device Driver: A term used to describe software or computer programs used to "drive" hardware. The invention can provide a driver by combining a kernel with one or more description tables.

Device Name: A device name is used by the operating system to reference defined character devices. LPT1: and $CIPHER: are examples of character device names used to reference a printer and a cipher tape drive respectively.

Environmental Map: A computer program means that translates (i.e. processes) an operating system request (and request structure) into a common kernel request (and request structure). The different kernels (e.g. MS DOS, Unix, etc.) translate the operating system request (and request structures) into a common set of requests (and request structures) that can be processed by device description tables.

Global Data Structure: A means for linking description tables to the kernel. The global data structure is comprised of fields into which information can be entered. The global data structure can contain configuration information as well as information used to control the sequence of operations of device description tables and adapter description tables. In addition, the global data structure can contain address pointers to each of the description tables used in the system. The global data structure can be comprised of device data structures and adapter data structures.

Initialization Map: A computer program means for loading description tables into the computer memory of a digital computer and for entering information into the fields of a global data structure. An initialization map is a computer program means for providing initialization routines to the kernel for initialization. Initialization routines can be any computer programs or routines which can be used to load or initialize description tables or to otherwise assist in such loading and initialization.

IOCTL Request: An IOCTL request is an operating system request that can include a pointer to an IOCTL request packet. The IOCTL request packet is used by a device description to create one or more device commands. When the IOCTL request (as an operating system request) is translated into a kernel request, the kernel request includes the pointer to the IOCTL request packet.

Kernel: A kernel is dependent on the operating system it supports and serves as a means for linking description tables to the operating system. Kernels can be structured with an interface for linking adapter and device description tables.

Kernel Request: An operating system request is translated by the environmental map into one or more kernel requests which can be processed by a device description table.

Logical Device: A logical device is defined by a device description table. Although logical devices do not represent physical devices directly, they need the support of physical devices through the use of one or more default devices. Logical devices are assigned a unit number or character device name by the operating system.

Pseudo Device: A pseudo device is a software construction that is used to process or translate data before it is written to a device (pre-processing) or after data is read from a device (post-processing). Pseudo devices do not function as physical devices nor do they control devices; they merely translate or process data. Pseudo devices are not assigned a unit number or a character device name.

Real Device: A real device is a physical block device that is assigned a unit number or a physical character device that is assigned a character device name by the operating system.

Sequencer: A computer program means for activating and sequencing the operation of description tables.

Service Map: A service map is a computer program means that provides service routines to the kernel and/or description tables. Service routines are any computer programs or routines that provide services or functions needed by the kernel or a description table in connection with the processing of an operating system request, kernel request or adapter request.

Unit: A unit is a block device defined by the operating system.

Unit Number: A unit number is used by the operating system to reference defined units. Unit numbers are assigned sequentially (0, 1, 2 . . . ).

VII. INDUSTRIAL APPLICABILITY

This invention is applicable to the computer industry and users of computers, devices and adapters. The invention has applicability to any other uses and technologies apparent from this description of the invention.

VIII. TABLES

Table 1

Field Entries for Device Data Structures

NAME: The name of the device is entered into the NAME field of the device's data structure and is used for reference. The NAME field is also used in this manner for adapters and adapter data structures. The NAMEs used in FIG. 3 refer to the system configuration of FIG. 2.

ADAPTER NUMBER: As shown in FIG. 2, each device description table is linked to an adapter description table. This ADAPTER NUMBER field defines this linkage. ADAPTER NUMBER fields are also used in adapter data structures to complete the linkage. More than one device description table can be linked to an adapter description table.

SCSI ID: This embodiment or example of the invention supports the SCSI interface and associated peripherals. The SCSI interface requires an identification address to be assigned to each device. This address can be defined by SCSI ID and SCSI LUN. This field contains the SCSI ID. Since interfaces other than SCSI can be used with the invention, this field can be used to identify device addressing for other interface standards.

SCSI LUN: SCSI supports a secondary level of device addressing —the Logical Unit Number. This field contains the SCSI LUN. This secondary level of addressing can also be used for other interface standards.

PARAMETER ADDRESS: The PARAMETER ADDRESS entry describes the address of the PARAMETER field in computer memory which contains parameter data.

PARAMETER: Parameters can be passed to device description tables to control their usage in a particular user application. As an example, a duplex shadow writing logical device description table can write to one, two or several devices. The control for the selection of this capability can be defined for each user configuration using the PARAMETER field. The PARAMETER field contains this parameter data. This field is also used for adapters and adapter data structures.

DEVICE TYPE: This field defines the DEVICE TYPE. The field is interrogated by pseudo devices when pre- or post-processing is defined for the device. The DEVICE TYPE can be any number. The DEVICE TYPE field of the global data structure is used to determine whether or not data associated with the device is to be processed by a pseudo device. The interpretation of what this field means is left to the developer of the pseudo device description table.

CONTROL BYTE: This field defines the device as a character device, block device, default device or pseudo device. The CONTROL BYTE field can allow a device description table to be used as a real device, a default device or both. The CONTROL BYTE field can also be used to define a pseudo device and pre- or post- processing of data. Shown below are the assignments of the bits of the CONTROL BYTE.

CONTROL BYTE BIT Definitions

```
#define CHAR_DEVICE      0x80   /* Character Device Type     */
#define BLOCK_DEVICE     0x40   /* Block Device Type         */
#define PSEUDO_DEVICE    0x20   /* Psuedo Device Type        */
#define DEFAULT_DEVICE   0x10   /* Default Device Type       */
#define PRE_PROC_BLK     0x08   /* Pre-Process Block Device  */
#define PRE_PROC_CHAR    0x04   /* Pre-Process Char Device   */
#define POST_PROC_BLK    0x02   /* Post-Process Block Device */
#define POST_PROC_CHAR   0x01   /* Post-Process Char Device  */
```

The CONTROL BYTE field provides a unique characteristic to the invention that is not found in other device drivers. This field is used to classify the device description table.

The concept of a block or character device is not new. These device types are described in great detail in the device driver implementation guides for MS-DOS, OS/2, Unix and other operating systems. However, the concept of pseudo and default devices, as implemented in this invention, is new. A pseudo device has a CONTROL BYTE value of 0x20. The last four bits (0x08, 0x04, 0x02 and 0x01) of the CONTROL BYTE DEV_control are used to describe the use of the pseudo device. For example, the pseudo device can provide pre-processing or post-processing for any kernel request issued to a character or block device. Therefore, it is possible to set the CONTROL BYTE value to 0x2A (by adding bits 0x20, 0x08 and 0x02). This defines the device as a pseudo device (0x20) and defines the device for pre-processing of block devices (0×08) and post-processing of block devices (0×02). For example, this CONTROL BYTE would define the use of a software cache program as a pseudo device that would pre-process and post-process the data associated with the kernel requests issued to the block devices.

DEFAULT NUMBER and DEFAULT BASE: The DEFAULT NUMBER and DEFAULT BASE fields are used to assign default device description table to logical device description tables. The DEFAULT NUMBER is the number of default devices to be assigned to a logical device description table. This assignment starts with the DEFAULT BASE number. As default device description table are entered into the global data structure through the configuration file (CONFIG.OAD), they are linked to the kernel in sequence. The DEFAULT BASE field identifies the first of the default device description tables to be assigned to the logical device description table. As the logical device description table requires additional default device description tables to perform their function, the next default device description table is taken in sequence from the ordered sequence of entries in the global data structure. The DEFAULT NUMBER identifies the number of default device description tables required by the logical device description table. The example of FIG. 3 indicates that Logical Device DU starts with the first default device (DEFAULT BASE 0) and DU and uses two default devices (DEFAULT NUMBER 2).

DEVICE ID CHECK: The proper operation of the device requires a match between the device description table and the physical device. The DEVICE ID CHECK field contains the information used by the device description table when the physical device is interrogated by the device description table as to the device's identification (i.e., this field is compared with the response from the device to determine if a match exists).

DEVICE ATTRIBUTE: This field contains information concerning device attributes as required or needed by the operating system. The form and content of this information are described in the technical reference manual of the applicable operating system.

UNIT QUEUE POINTER: The UNIT QUEUE POINTER field contains a FAR pointer that is used as the head of the linked list of kernel requests that form the kernel request queue. The UNIT QUEUE POINTER provides a kernel request queue and queue access mechanism. The ability to queue kernel requests is not of much interest in the MS-DOS environment, but in a multi-tasking environment like OS/2 or Unix it becomes an essential component of a high-performance device driver.

REQUEST POINTER: The REQUEST POINTER field contains a FAR Pointer to a kernel request. When the device description table is invoked the REQUEST POINTER contains the address of the current kernel request. The environmental map of the kernel allocates a kernel request block and translates the operating system request into a kernel request. Once the kernel request is initialized, the address of this request is placed in REQUEST POINTER.

DEVICE REGISTERS: The device data structure contains a number of data regions that would typically be found in the data segment of the device description table. However, because shared description tables may be used, it is important to control the read/write access to any shared device description tables. For example, if a device description table is shared, meaning that both the data segments as well as the code segments of the device description table are shared by two or more devices, then access to its data must either be controlled with semaphores or read only. The conditions surrounding mutual access of data precludes the use of data for critical read/write variables. One of those critical read/write variables is the DEV_REGISTERS variable. DEVICE REGISTERS is the temporary working storage that is primarily used by device description tables to perform service map routines (e.g. DevHlp routines). Service routines often require temporary memory or a place to store the result of the operation. The service routines utilize the DEVICE REGISTERS data region for this purposes. The results of the service routines are placed in this memory. The DEVICE REGISTERS field is organized into independent register variables that reflect the contents of the actual hardware registers. Therefore, there is an AX register, a BX register and so on as defined in the following C data structure.

```
struct          REGPACK                         {
    unsigned        int         r_ax;
    unsigned        int         r_bx;
    unsigned        int         r_cx;
    unsigned        int         r_dx;
    unsigned        int         r_bp;
    unsigned        int         r_si;
    unsigned        int         r_di;
    unsigned        int         r_ds;
    unsigned        int         r_es;
    unsigned        int         r_flags;        }
```

These registers contain results from the service routines. This field is also used for adapters and adapter data structures.

DEVHLP ADDRESS: This field contains the address of the service routine pointer map, i.e., the DevHlp pointer map.

DEVHLP RETURN: This field contains the return error code from the service routine (DevHlp routine).

VIRTUAL ADDRESS CODE: This field contains the virtual address of the code segment of the description table.

VIRTUAL ADDRESS DATA: This field contains the virtual address of the data segment of the description table.

PHYSICAL ADDRESS CODE: This field contains the physical address of the code segment of the description table.

PHYSICAL ADDRESS DATA: This field contains the physical address of the data segment of the description table.

CELL PROCESSOR ADDRESS: This field contains an offset from the description table code segment address and points to the cell processor.

STATE EVENT TABLE ADDRESS: This field contains an offset from the description table data segment and points to the state event table.

CURRENT STATE: The CURRENT STATE of the description table is contained in this field.

LAST EVENT: The LAST EVENT of the description table is contained in this field.

MAX NUMBER EVENTS: This field identifies the maximum number of events and is used with MAX NUMBER STATES to describe the size of the State Event Table and is used to index through the events and states of the table.

MAX NUMBER STATES: This identifies the maximum number of events and is used with the MAX NUMBER EVENTS to describe the size of the State Event Table and is used to index through the events and states of the table.

ERROR: The ERROR field is used to store error codes whenever generated by the description table. These error codes are as follows:

```
#define    WRITE_PROTECT    0x00    /* Write Protect Violation      */
#define    UNKNOWN_UNIT     0x01    /* Unit Not Known By Driver     */
#define    NOT_READY        0x02    /* Device Is Not Ready          */
#define    UNKNOWN_CMD      0x03    /* Unknown Device Command       */
#define    CRC_ERROR        0x04    /* Device CRC Error             */
#define    BAD_REQ_LEN      0x05    /* Bad Drive Req Struct Len     */
#define    SEEK_ERROR       0x06    /* Device Seek Error            */
#define    UNKNOWN_MEDIA    0x07    /* Unknown Media In Drive       */
#define    NO_FOUND         0x08    /* Sector Not Found             */
#define    OUT_OF_PAPER     0x09    /* Printer Out of Paper         */
#define    WRITE_FAULT      0x0A    /* Device Write Fault           */
#define    READ_FAIL        0x0C    /* General Device Failure       */
#define    CHANGE_DISK      0x0D    /* Change Disk (Logical)        */
#define    RES_CMD_01       0x0E    /* Reserved                     */
#define    RES_CMD_02       0x0F    /* Reserved                     */
#define    UNCERTAIN        0x10    /* Uncertain Media              */
#define    CHAR_IO_INT      0x11    /* Char I/O Call Interrupted    */
#define    NO_MON_SUP       0x12    /* Monitors Not Supported       */
#define    INVALID_PARM     0x13    /* Invalid Parameter            */
```

DEVICE STATUS BYTE: This field stores the status of the device.

Table 2

Field Entries for Adapter Data Structures

NAME: (Already described in Table 1).

ADAPTER NUMBER: (Already described in Table 1b).

SCSI ID: The address of the adapter (SCSI ID and SCSI LUN) is entered into this field.

PARAMETER ADDRESS: (Already described in Table 1).

PARAMETER: (Already described in Table 1).

ADAPTER IRQ LEVEL: This entry describes the level to which the adapter presents its interrupt requests.

ADAPTER DMA CHANNEL: This entry describes the DMA channel used by the adapter.

PORT ADDRESS: Each I/O port of a computer has an address. This entry is the base port address where the adapter is installed.

NUMBER PORT ADDRESSES: Each adapter can use multiple ports, starting with the base port address. This entry describes the number of addresses used by the adapter.

BASE MEMORY ADDRESS: The computer supports memory mapped I/O transfers (i.e. the registers on the adapter are mapped into effective memory addresses). Thus the computer can write or read to these registers as if it was writing to actual computer memory. This entry contains the base address used in the memory address space to which the adapter is assigned.

NUMBER MEMORY ADDRESSES: This entry describes the number of memory addresses used by the adapter when operating with memory mapped I/O transfers.

BASE BUFFER ADDRESS: The kernel supports buffered I/O transfer. When a buffer is used by the adapter, its base address is defined in this entry.

NUMBER BUFFER BYTES: This entry describes the size of the buffer used by the adapter.

MEMORY MAPPED SELECTOR: Memory mapped adapters require selectors to be identified when operating in protected mode. This information is contained in this field.

DEVICE REGISTERS: (Already described in Table 1).

DEVHLP ADDRESS: (Already described in Table 1).

DEVHLP RETURN: (Already described in Table 1).

VIRTUAL ADDRESS CODE: (Already described in Table 1).

VIRTUAL ADDRESS DATA: (Already described in Table 1).

PHYSICAL ADDRESS CODE: (Already described in Table 1).

PHYSICAL ADDRESS DATA: (Already described in Table 1).

INTERRUPT SERVICE ROUTINE ADDRESS: This field contains the offset from the description table code segment address and points to the interrupt service routine.

CELL PROCESSOR ADDRESS: (Already described in Table 1).

STATE EVENT TABLE ADDRESS: (Already described in Table 1).

CURRENT STATE: (Already described in Table 1).

LAST EVENT: (Already described in Table 1).

MAX NUMBER EVENTS: (Already described in Table 1).

MAX NUMBER STATES: (Already described in Table 1).

ERROR: (Already described in Table 1).

ADAPTER STATUS VARIABLE: This field stores the status of the adapter.

Table 3

Adapter Request Fields

SCSI COMMAND DESCRIPTION: This field controls the type of transfer of data requested from the adapter description table. Codes for the SCSI COMMAND DESCRIPTION field are as follows:

```
#define BLOCK_XFER     0x01    /*Block Transfer Type         */
#define DATA_OUT       0x02    /*Host Direction Out (Data)   */
#define NO_DATA        0x04    /*No Data To Be Transferred   */
#define BYTES_IN       0x00    /*Bytes of Data In            */
#define BYTES_OUT      0x02    /* Bytes of Data Out          */
#define BLOCK_IN       0x01    /*Blocks of Data In           */
#define BLOCK_OUT      0x03    /* Blocks of Data Out         */
```

SCSI ID FOR TARGET DEVICE: This field contains the SCSI address as defined for the user's configuration. This field contains the SCSI ID and SCSI LUN of the device targeted by the kernel request.

LENGTH OF CDB: The length of the CDB AREA is contained in the LENGTH OF CDB field.

CDB AREA: SCSI devices are controlled by SCSI command description blocks ("CDBs"). The CDB AREA field contains the SCSI CDB generated by the device description table. The CDB is a device command for the device. The contents of the CDB AREA field are transferred by the adapter description table to the targeted device without modification or use by the adapter description table. This allows the adapter description table to be prepared in a device independent manner. For non-SCSI devices the CDB AREA field can contain a non-SCSI command issued to and executed by the device. This non-SCSI command would be determined by the specific non-SCSI interface used by the non-SCSI device.

LENGTH OF DATA BUFFER: Data is transferred by the adapter description table to and from the physical device using a data buffer. The amount of data (number of bytes) to be transferred is contained in this field.

PHYSICAL DATA POINTER: This field contains the physical address of the data buffer.

VIRTUAL DATA POINTER: This field contains the virtual address of the data buffer.

BYTES PER SECTOR: This field contains the block size of the data to be transferred by the adapter description table to and from the physical device using a data buffer.

SCSI ROUTINE RETURN CODE: This field returns to the kernel the response from the adapter description table with the results from the execution of the adapter request. Codes are as follows:

| | | | |
|---|---|---|---|
| #define ERROR_NONE | 0x00 | /*No Problems with Command | */ |
| #define ERROR_CHECK | 0x01 | /*Check Condition Reported | */ |
| #define ERROR_HWBUSY | 0x02 | /*Hardware Busy Reported | */ |
| #define ERROR_GO_STAT | 0x0F | /*Internal Go To Status | */ |
| #define ERROR_FREE | 0x10 | /*Bus Free Phase Error | */ |
| #define ERROR_SELECT | 0x11 | /*Select Phase Error | */ |
| #define ERROR_COMMAND | 0x12 | /*Command Phase Error | */ |
| #define ERROR_DATA | 0x13 | /*Data Phase Error | */ |
| #define ERROR_DATA | 0x14 | /*Status Phase Error | */ |

* * * * * *

TABLE 4

C DATA STRUCTURE OF DEVICE BPB struct BPB_struct {

| | | |
|---|---|---|
| unsigned int_wps; | /* Words Per Sector | */ |
| unsigned char_spau; | /* Sectors Per Allocation Un | */ |
| unsigned int_rs; | /* Reserved Sectors | */ |
| unsigned char_num_fats; | /* Number of FATS | */ |
| unsigned int_root_entries; | /* # Of Root Dir Entries | */ |
| unsigned int_num_sectors; | /* Number of Sectors | |
| unsigned char_media_descriptor: | /* Media Descriptor | */ |
| unsigned int_spfat; | /* # Of Sectors Per FAT | */ |
| unsigned int_spt; | /* # Of Sectors Per Track | */ |
| unsigned int_heads; | /* Number of Heads | */ |
| unsigned long_hidden; | /* Number of Hidden Sectors | */ |
| unsigned long_large_sec; | /* Large Number of Sectors | */ |
| unsigned char_res_field [6]; | /* Reserved Field | */ |
| unsigned int_num_cyl; | /* Number of Cylinders | */ |
| unsigned char_type; | /* Type of Device | */ |
| unsigned int_attribute; | /* Device AttributeField | */}; |

* * * * * *

35

TABLE 5

CONFIGURATION RECORD struct INI_struct {

| | | |
|---|---|---|
| unsigned char INI_rec_type; | /* Adapter, Device | */ |
| unsigned char INI_irq; | /* Adapter IRQ Level | */ |
| unsigned char INI_dma; | /* Adapter DMA Channel | */ |
| unsigned char INI_scsi_id; | /* SCSI ID | */ |
| unsigned int INI_IO_size; | /* Number Port Addresses | */ |
| unsigned int INI_mem_size; | /* Number Memory Addresses | */ |
| unsigned int INI_buf_size; | /* Number Buffer Bytes | */ |
| unsigned int INI_IO_base; | /* Port Address | */ |
| unsigned long INI_mem_base; | /* Base Memory Address | */ |
| unsigned long INI_buf_base; | /* Base Buffer Address | */ |
| unsigned char INI_NAME [FILE]; | /* NAME | */ |
| unsigned char INI_type; | /* DEVICE TYPE | */ |
| unsigned char INI_ID_chk [ID]; | /* DEVICE ID CHECK | * |
| unsigned char INI_adapter; | /* Adapter NUMBER | * |
| unsigned char INI_scsi_ID; | /* SCSI ID | */ |
| unsigned char INI_scsi_LUN; | /* SCSI LUN | */ |
| unsigned char INI_control; | /* Control BYTE | */ |
| unsigned int INI_attribute; | /* Device Attributes | */ |
| unsigned char INI_params [STRINGSIZE]; | /* INI Parameter Buffer | */ |

* * * * * *

TABLE 6

OS/2 OPERATING SYSTEM REQUESTS

```
struct    REQ struct
{
    unsigned char length;              /* Length In Bytes of Req      */
    unsigned char unit;                /* Minor Device Unit Number    */
    unsigned char command;             /* Device Command Code         */
    unsigned int status;               /* Device Status Word          */
    unsigned char reserved [8];        /* Reserved For DOS            */
    union
    {
        struct    INIT_struct              init_req;
        struct    MEDIA_CHECK_struct        media_check_req;
        struct    BUILD_BPB_struct          build_bpb_req;
        struct    READ_struct               read_req;
        struct    READ_NO_WAIT_struct       read_no_wait_req;
        struct    INPUT_STATUS_struct       input_status_req;
        struct    INPUT_FLUSH_struct        input_flush_req;
        struct    WRITE_struct              write_req;
        struct    WRITE_VERIFY_struct       write_verify_req;
        struct    OUTPUT_STATUS_struct      output_status_req;
        struct    OUTPUT_FLUSH_struct       output_flush_req;
        struct    DEV_OPEN_struct           dev_open_req;
        struct    DEV_CLOSE_struct          dev_close_req;
        struct    REMOVE_MEDIA_struct       remove_media_req;
        struct    IOCTL_struct              ioctl_req;
        struct    RESET_MEDIA_struct        reset_media_req;
        struct    GET_L_D_MAP_struct        get_l_d_mep_req;
        struct    SET_L_D_MAP_struct        set_l_d_map_req;
        struct    DEINSTALL_struct          deinstall_req;
        struct    PORT_ACCESS_struct        PORT_access_req;
        struct    PARTITIONABLE_struct      partitionable_req;
        struct    GET_F_D_MAP_struct        get_f_d_map_req;
        unsigned char
    } req type;
};
```

* * * * * *

TABLE 7

KERNEL REQUESTS

| | | | |
|---|---|---|---|
| #define INIT | 10 | /* Initialize Device | */ |
| #define MEDIA_CHECK | 1 | /* Check For Correct Media | */ |
| #define BUILD_BPB | 2 | /* Build A BIOS Parm Block | */ |
| #define RESERVED_1 | 3 | /* Reserved Command 1 | */ |
| #define READ | 4 | /* Device Read Operation | */ |
| #define READ_NO_WAIT | 5 | /* No Wait Input (Char Only) | */ |
| #define INPUT_STATUS | 6 | /* Character Devices Only | */ |
| #define INPUT_FLUSH | 7 | /* Character Devices Only | */ |
| #define WRITE | 8 | /* Device Write Operation | */ |
| #define WRITE_VERIFY | 9 | /* Device Write/Verify Oper | */ |
| #define OUTPUT_STATUS | 10 | /* Character Devices Only | */ |
| #define OUTPUT_FLUSH | 11 | /* Character Devices Only | */ |
| #define RESERVED_2 | 12 | /* Reserved Command 2 | */ |
| #define DEV_OPEN | 13 | /* Device Open Command | */ |
| #define DEV_CLOSE | 14 | /* Device Close Command | */ |
| #define REMOVE_MEDIA | 15 | /* Removable Media | */ |
| #define IOCTL | 16 | /* Generic IOCTL | */ |
| #define RESET_MEDIA | 17 | /* Reset Media Command | */ |
| #define GET_L_D_MAP | 18 | /* Get Logical Drive Map | */ |
| #define SET_L_D_MAP | 19 | /* Set Logical Drive Map | */ |
| #define DEINSTALL | 20 | /* Deinstall Driver | */ |
| #define PORT_ACCESS | 21 | /* Port Access Command | */ |
| #define PARTITIONABLE | 22 | /* Partitionable Fixed Disks | */ |
| #define GET_F_D_MAP | 23 | /* Get Fixed Disk Map | */ |
| #define RESERVED_3 | 24 | /* Reserved Command 3 | */ |
| #define RESERVED_4 | 25 | /* Reserved Command 4 | */ |
| #define RESERVED_5 | 26 | /* Reserved Command 5 | */ |
| #ifdef DOS_CDROM | | | |
| #define READ_LONG | 128 | /* CD-ROM Read Long Command | */ |
| #define RESERVED_5 | 129 | /* Reserved Command 6 | */ |

TABLE 7-continued

| #define READ_LONG_PF | 130 | /* CD-ROM Read Long Prefetch | */ |
| #define SEEK | 131 | /* CD-ROM Seek Command | */ |
| #define PLAY | 132 | /* CD-ROM Play Command | */ |
| #define STOP_PLAY | 133 | /* CD-ROM Stop Play Command | */ |
| #endif | | | |

\* \* \* \* \* \*

TABLE 8

MS-DOS OPERATING SYSTEM REQUESTS

```
struct DOS REQ struct
{
    unsigned char length;            /* Length In Bytes of Req       */
    unsigned char unit;              /* Minor Device Unit Number     */
    unsigned char command;           /* Device Command Code          */
    unsigned int status;             /* Device Status Word           */
    unsigned char reserved [8];      /* Reserved For DOS             */
    union
    {
        struct    DOS_INIT_struct              init_req;
        struct    DOS_MEDIA_CHECK_struct       media_check_req;
        struct    DOS_BUILD_BPB_struct         build_bpb_req;
        struct    DOS_IOCTL_INPUT_struct       ioctl_input_req;
        struct    DOS_INPUT_struct             input_req;
        struct    DOS_INPUT_NO_WAIT_struct     input_no_wait_req;
        struct    DOS_INPUT_STATUS_struct      input_status_req;
        struct    DOS_INPUT_FLUSH_struct       input_flush_req;
        struct    DOS_OUTPUT_struct            outpuit_req;
        struct    DOS_OUTPUT_VERIFY_struct     output_verify_req;
        struct    DOS_OUTPUT_STATUS_struct     output_status_req;
        struct    DOS_OUTPUT_FLUSH_struct      output_flush_req;
        struct    DOS_IOCTL_OUTPUT_struct      ioctl_output_req;
        struct    DOS_DEV_OPEN_struct          dev_open_req;
        struct    DOS_DEV_CLOSE_struct         dev_close_req;
        struct    DOS_REMOVE_MEDIA_struct      remove_media_req;
        struct    DOS_IOCTL_struct             ioctl_req;
        struct    DOS_GET_L_D_MAP_struct       get_l_d_map_req;
        struct    DOS_SET_L_D_MAP_struct       set_l_d_map_req;
        unsigned char                                   variable data [12];
    } req type;
};
```

\* \* \* \* \* \*

TABLE 9

CONTROL EVENTS

| #define INITIAL_STATE | 0x00 | /* Initial State of SM | */ |
| #define INITIAL_EVENT | 0x00 | /* Initial State of SM | */ |
| #define CONTROL_EVENTS | 0xF0 | /* State Machine Control Ev | */ |
| #define EXIT_SM_EVENT | 0xFF | /* Exit State Machine | */ |
| #define ERR_SM_EVENT | 0xFE | /* Error Event From SM | */ |
| #define INT_SM_EVENT | 0xFD | /* Interrupt Occurred Event | */ |
| #define ADP_SM_EVENT | 0xFC | /* Invoke Adapter SM | */ |
| #define IFM_SM_EVENT | 0xFA | /* Invoke IFM State Machine | */ |
| #define RESERVED_F9 | 0xF9 | /* Reserved Control Event | */ |
| #define RESERVED_F8 | 0xF8 | /* Reserved Control Event | */ |
| #define RESERVED_F7 | 0xF7 | /* Reserved Control Event | */ |
| #define RESERVED_F6 | 0xF6 | /* Reserved Control Event | */ |
| #define RESERVED_F5 | 0xF5 | /* Reserved Control Event | */ |
| #define RESERVED_F4 | 0xF4 | /* Reserved Control Event | */ |
| #define RESERVED_F3 | 0xF3 | /* Reserved Control Event | */ |
| #define RESERVED_F2 | 0xF2 | /* Reserved Control Event | */ |
| #define RESERVED_F1 | 0xF1 | /* Reserved Control Event | */ |
| #define RESERVED_F0 | 0xF0 | /* Reserved Control Event | */ |

What is claimed is:

1. A method for controlling a device on a digital computer system, said digital computer system including:

a central processor including a memory for storing instructions and data, an adapter attached to said central processor, a device attached to said adapter, and an operating system for controlling said central processor, the method comprising:
- (a) receiving an operating system request by a device driver kernel, said device driver kernel particular to said operating system;
- (b) translating said operating system request by said device driver kernel into an operating-system-independent kernel request;
- (c) processing said kernel request to create an adapter request by a device description table, said device description table particular to said device and independent of said operating system and having at least one device action routine and a device action list, said processing said kernel request to form said adapter request by said device description table comprising: selecting one of more device action routines from said device action list in said device description table necessary for processing said kernel request;
and executing said selected device action routines; and
- (d) processing said adapter request to control said device on said adapter by an adapter description table, said adapter description table particular to said adapter and independent of said operating system and having at least one adapter action routine and an adapter action list, said processing said adapter request to control said device on said adapter by said adapter description table comprising: selecting one or more adapter action routines from said adapter action list in said adapter description table necessary for processing said adapter request; and executing said selected adapter action routines.

2. The method of claim 1, said device driver kernel including an environmental map, and said device driver kernel using said environmental map during said translating said operating system request into said kernel request.

3. The method of claim 1, said device description table further having device configuration information, and said device driver kernel selecting said one or more device action routines from said device action list based on said kernel request and said device configuration information.

4. The method of claim 1, said device description table having device configuration information, and said device configuration information used by said one or more device action routines in creating an adapter request.

5. The method of claim 4, said device configuration information comprising information identifying the name of said device, information identifying said adapter as the adapter to which said device is attached, and information identifying said device's address.

6. The method of claim 1, said adapter description table further having adapter configuration information, and said device driver kernel selecting said one or more adapter action routines from said adapter action list based on said adapter request and said adapter configuration information.

7. The method of claim 1, said adapter description table further having adapter configuration information, and said adapter configuration information used by said one or more adapter action routines in processing said adapter request.

8. The method of claim 7, said adapter configuration information comprising information identifying the name of said adapter and information identifying said adapter's address for use by said adapter action routine in processing said adapter request.

9. A method for controlling a device on a digital computer system, said digital computer system including:

a central processor including a memory for storing instructions and data, an adapter attached to said central processor, a device attached to said adapter, and an operating system for controlling said central processor, the method comprising:
- (a) receiving an operating system request by a device driver kernel, said device driver kernel particular to said operating system;
- (b) translating said operating system request by said device driver kernel into an operating-system-independent kernel request;
- (c) processing said kernel request to create an adapter request by a device description table, said device description table particular to said device and independent of said operating system and having:
  at least one device action routine,
  a device action list, and
  device configuration information;
  said processing said kernel request to form said adapter request by said device description table comprising:
  selecting one of more device action routines from said device action list in said device description table by said device driver kernel based on said kernel request and said device configuration information;
  and executing said selected device action routines; and
- (d) processing said adapter request to control said device on said adapter by an adapter description table, said adapter description table particular to said adapter and independent of said operating system and having:
  at least one adapter action routine,
  an adapter action list, and
  adapter configuration information;
  said processing said adapter request to control said device on said adapter by said adapter description table comprising:
  selecting one or more adapter action routines from said adapter action list in said adapter description table by said device driver kernel based on said adapter request and said adapter configuration information;
  and executing said selected adapter action routines.

* * * * *